United States Patent
Yang

(10) Patent No.: US 8,058,814 B2
(45) Date of Patent: *Nov. 15, 2011

(54) BI-DIRECTIONAL LIGHT EMITTING DIODE DRIVE CIRCUIT IN PULSED POWER SERIES RESONANCE

(76) Inventor: Tai-Her Yang, Dzan-Hwa (TW)

( * ) Notice: Subject to any disclaimer, the term of this patent is extended or adjusted under 35 U.S.C. 154(b) by 309 days.

This patent is subject to a terminal disclaimer.

(21) Appl. No.: 12/351,911

(22) Filed: Jan. 12, 2009

(65) Prior Publication Data

US 2009/0179578 A1    Jul. 16, 2009

Related U.S. Application Data

(60) Provisional application No. 61/020,805, filed on Jan. 14, 2008.

(51) Int. Cl.
*H05B 41/16* (2006.01)
(52) U.S. Cl. .................. 315/250; 315/307; 315/291
(58) Field of Classification Search .............. 315/246, 315/248, 250, 258, 283, 290, 291, 297, 307, 315/227 R, 228, 239, 244, 276
See application file for complete search history.

(56) References Cited

U.S. PATENT DOCUMENTS

| | | | | |
|---|---|---|---|---|
| 5,247,238 | A * | 9/1993 | Yang | 320/142 |
| 6,628,085 | B2 * | 9/2003 | Yang | 315/169.3 |
| 7,164,237 | B2 * | 1/2007 | Van Casteren | 315/209 R |
| 7,489,086 | B2 * | 2/2009 | Miskin et al. | 315/185 R |
| 7,564,198 | B2 * | 7/2009 | Yamamoto et al. | 315/307 |
| 7,868,561 | B2 * | 1/2011 | Weightman et al. | 315/294 |
| 2006/0197466 | A1 * | 9/2006 | Park | 315/224 |
| 2008/0211421 | A1 * | 9/2008 | Lee et al. | 315/250 |
| 2008/0231204 | A1 * | 9/2008 | Praiswater et al. | 315/192 |

* cited by examiner

*Primary Examiner* — Shawki S Ismail
*Assistant Examiner* — Crystal L Hammond
(74) *Attorney, Agent, or Firm* — Rabin & Berdo, P.C.

(57) ABSTRACT

The present invention comprises of a first impedance constituted by the capacitive impedance and a second impedance constituted by the inductive impedance, wherein the first and second impedance after series connection appears in the series resonance status to generate a bi-directional divided power in series resonance to drive the bi-directional conducting light emitting diode parallel connected with the first or second impedance.

23 Claims, 9 Drawing Sheets

US 8,058,814 B2

BI-DIRECTIONAL LIGHT EMITTING DIODE DRIVE CIRCUIT IN PULSED POWER SERIES RESONANCE

BACKGROUND OF THE INVENTION (a) Field of the Present Invention

The bi-directional light emitting diode (LED) drive circuit in pulsed power series resonance is disclosed by that a first impedance which is constituted by capacitive impedance components and a second impedance which is constituted by inductive impedance components, whereof the said two are mutually series connected and their inherent series resonance in series connection is the same as the pulse period of the pulsed power, whereby to appear series resonance status. The bi-directional divided power in series resonance is formed across the two ends of the mutually series connected capacitive and inductive impedance components, whereof it is characterized in that the bi-directional conducting light emitting diode set which is parallel connected with the first or second impedances is driven by the said divided power, or at least two bi-directional conducting light emitting diode sets which are respectively parallel connected across the two ends of either the first impedance or the second impedance are driven by the respective divided powers across the two ends of either the first impedance or the second impedance.

(b) Description of the Prior Art

In the conventional Light emitting diode drive circuit using AC or DC power source, light emitting diode current is usually limited by series connecting a current limit resistor as the impedance, whereby the voltage drop of the resistive impedance in series connection normally consumes a lot of electrical power and causes accumulated heat that are its imperfections.

SUMMARY OF THE INVENTION

The present invention is comprised of that a first impedance is constituted by capacitive impedance components and a second impedance is constituted by inductive impedance components, whereof the said two are mutually series connected and their inherent series resonance in series connection is the same as the pulse period of the input pulsed power, thereby to generate a series resonance status. In the series resonance, the bi-directional divided power in series resonance is formed across the two ends of the capacitive impedance component or the inductive impedance component, thereby to drive the bi-directional conducting light emitting diode set which is parallel connected across the two ends of either the first impedance or the second impedance to emit light.

DESCRIPTION OF MAIN COMPONENT SYMBOLS

C100: Capacitor
CR100, CR101, CR102, CR201, CR202: Diode
ESD101, ESD102: Charge/discharge device
I100, I103, I104, I200: Inductive impedance component IT200: Separating type transformer
L100: Bi-directional conducting light emitting diode set
LED101: First light emitting diode
LED102: Second light emitting diode
R101: Discharge resistance
R100, R103, R104: Current limit resistor
ST200: Self-coupled transformer
U100: Bi-directional light emitting diode drive circuit
W0: Self-coupled voltage change winding
W1: Primary side winding
W2: Secondary side winding
Z101: First impedance
Z102: Second impedance
ZD101, ZD102: Zener diode
300: Bi-directional power modulator of series connection type
360: DC power modulator of series connection type
400: Bi-directional power modulator of parallel connection type
460: DC power modulator of parallel connection type
500: Impedance component
600: Switching device
5000: DC to DC Converter

DETAILED DESCRIPTION OF THE PREFERRED EMBODIMENTS

The bi-directional light emitting diode in pulsed power series resonance, whereof the bi-directional light emitting diode drive circuit (U100) is comprised of at least one first impedance which is constituted by capacitive impedance components, at least one second impedance which is constituted by inductive impedance components, and at least one bi-directional light emitting diode set which is constituted by parallel connected at least one first light emitting diode and at least one second light emitting diode in inverse polarity and is parallel connected across the two ends of at least one first impedance or at least one second impedance, whereof the two ends of the first impedance and the second impedance in series connection are for inputting:

(1) DC pulsed power; or
(2) The DC pulsed power with constant or variable voltage and constant or variable periods converted from DC power source; or
(3) The DC pulsed power with constant or variable voltage and constant or variable periods converted from DC power which is further rectified from AC power; or
(4) The half-wave or full-wave DC pulsed power rectified from AC power with constant or variable voltage and constant or variable frequency;

The bi-directional divided power in series resonance formed by the first and second impedances in series resonance is used to drive at least one bi-directional conducting light emitting diode set which is parallel connected across two ends of either the first impedance or the second impedance, or to drive at least two bi-directional conducting light emitting diode sets which are respectively parallel connected across the two ends of the first impedance and the second impedance to receive the divided power across the two ends of the first impedance and the two ends of the second impedance thereby to constitute the said bi-directional light emitting diode drive circuit in pulsed power series resonance.

Figure 1:
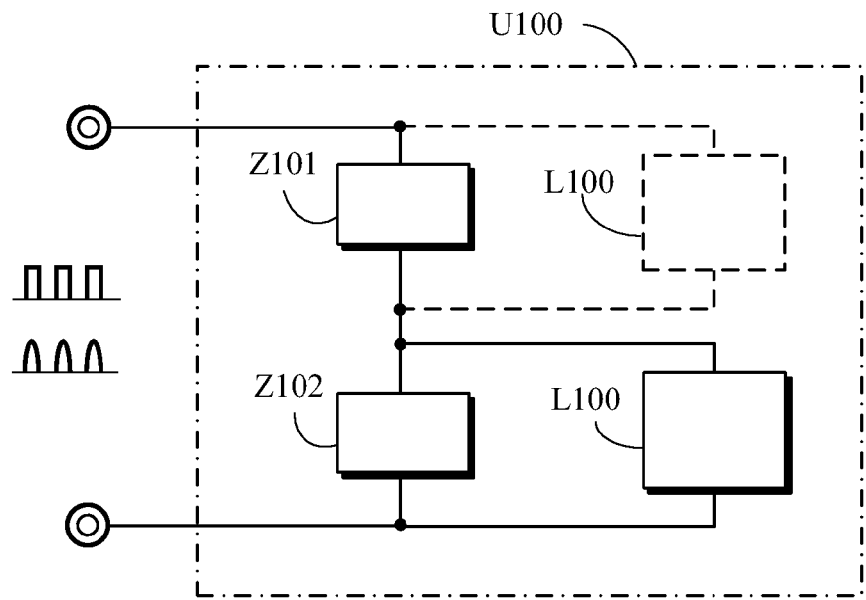
FIG. 1 is the schematic block diagram of the bi-directional light emitting diode drive circuit in pulsed power series resonance.

FIG. 1 is the schematic block diagram of the bi-directional light emitting diode drive circuit in pulsed power series resonance, in which the related circuit function is operated through the bi-directional light emitting diode drive circuit (U100) as shown in FIG. 1; it is mainly comprised of:

A first impedance (Z101) including:
The first impedance (Z101) is mainly comprised of at least one capacitive impedance component, or two or more than two capacitive impedance components in series connection or parallel connection or series and parallel connection; or
The first impedance (Z101) is constituted by capacitive impedance components and the additional inductive impedance components or resistive impedance components which can be optionally installed as needed, whereof it can be constituted by one or more than one kinds and one or more than one impedance components, or by two or more than two kinds of impedance components, whereof each kind of the impedance components is respectively to be one of more than one in series connection or parallel connection or series and parallel connection.

A second impedance (Z102) is mainly comprised of at least one inductive impedance component, or two or more than two inductive impedance components in series connection or parallel connection or series and parallel connection; or
The second impedance (Z102) is constituted by inductive impedance components and the additional capacitive impedance components or resistive impedance components which can be optionally installed as needed, whereof it can be constituted by one or more than one kinds and one or more than one impedance components, or by two or more than two kinds of impedance components, whereof each kind of the impedance components is respectively to be one of more than one in series connection or parallel connection or series and parallel connection.

At least one first impedance (Z101) and at least one second impedance (Z102) are in series connection and are arranged to receive the pulsed power from power source at their two ends, whereof their inherent series resonance frequency in series connection is the same as the pulse period of the pulsed power from power source, thereby to appear series resonance status. At series resonance status, the first impedance (Z101) and the second impedance (Z102) cause the inputted pulsed power to form the bi-directional divided power in series resonance, which is then transmitted to the bi-directional conducting light emitting diode set (L100) that is parallel connected with the first impedance (Z101) or the second impedance (Z102) to drive the bi-directional conducting light emitting diode set (L100) to emit light.

A bi-directional conducting light emitting diode set (L100): it is constituted by at least one first light emitting diode (LED101) and at least one second light emitting diode (LED102) in parallel connection of inverse polarities, whereof the numbers of the first light emitting diode (LED101) and the numbers of the second light emitting diode (LED102) can be the same or different, further, the first light emitting diode (LED101) and the second light emitting diode (LED102) can be respectively constituted by one forward current polarity light emitting diode; or two or more than two forward current polarity light emitting diodes in series or parallel connections; or three or more than three forward current polarity light emitting diodes in series or parallel connections or in series and parallel connections;

The bi-directional conducting light emitting diode set (L100) can be optionally installed with one or more than one sets as needed to be parallel connected across the two ends of both or either of the first impedance (Z101) or the second impedance (Z102), whereof through the power input, the bi-directional divided power in series resonance is formed at the two ends of both the first impedance (Z101) and the second impedance (Z102), thereby to drive the bi-directional conducing light emitting diode set (L100) which is parallel connected across the two ends of the first impedance (Z101) or the second impedance (Z102) to emit light;

The bi-directional light emitting diode drive circuit in pulsed power series resonance, in the bi-directional light emitting diode drive circuit (U100) the first impedance (Z101) and the second impedance (Z102) as well as the bi-directional conducting light emitting diode set (L100) can be selected to be one or more than ones as needed.

The bi-directional divided power in series resonance formed by the first and second impedances in series resonance is used to drive at least one bi-directional light emitting diode set which is parallel connected across the two ends of the first impedance or the second impedance, or to drive at least two bi-directional conducting light emitting diode sets which are respectively parallel connected across the two ends of the first impedance and the second impedance to receive the divided power across the two ends of the first impedance and the two ends of the second impedance thereby to constitute the said bi-directional light emitting diode drive circuit in pulsed power series resonance.

Figure 2:
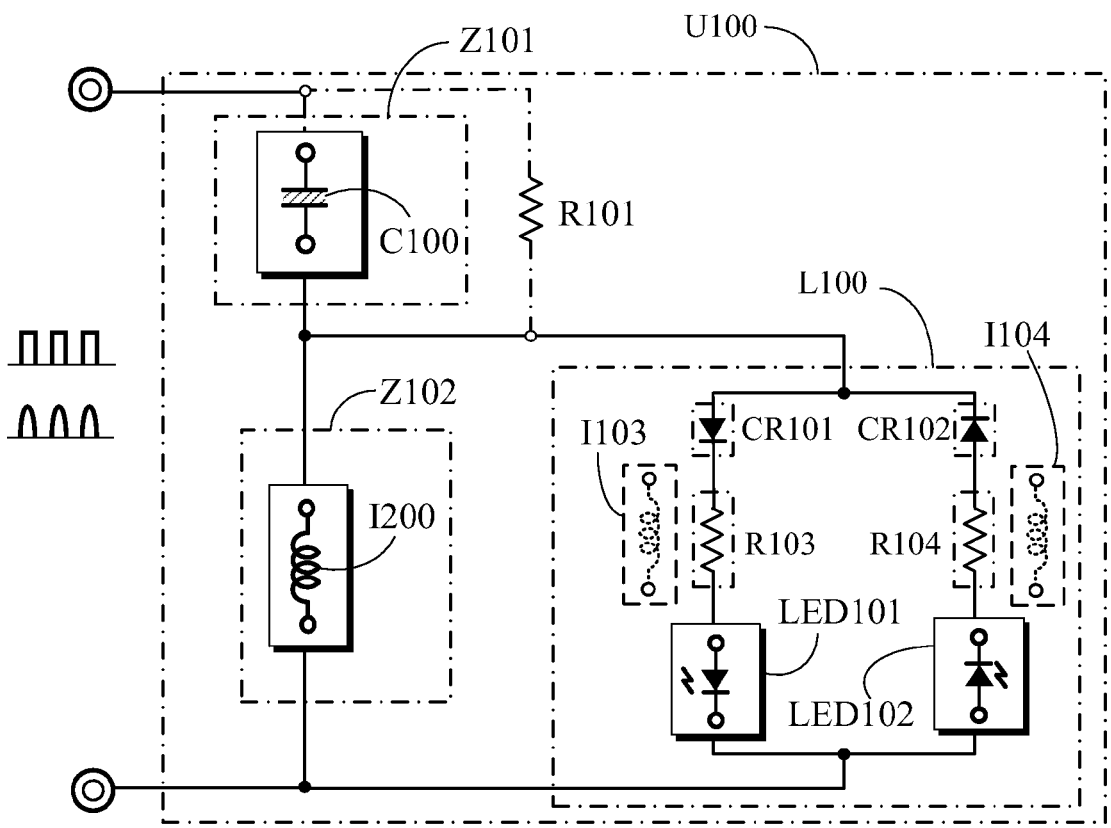
FIG. 2 is the circuit example schematic diagram of the present invention.

For convenience of description, the components listed in the circuit examples of the following exemplary embodiments are selected as in the following:

(1) A first impedance (Z101) and a second impedance (Z102) as well as a bi-directional conducting light emitting diode set (L100) are installed. Nonetheless, the selected quantities are not limited in actual applications;

(2) The capacitive impedance of the capacitor is selected to represent the impedance components, thereby to constitute the first impedance (Z101) and the second impedance (Z102) in the embodied examples, whereof the capacitive, inductive and/or resistive impedance components can be optionally selected as needed in actual applications, whereby it is described in the following:

FIG. 2 is a circuit example schematic diagram of the present invention which is comprised of:

A first impedance (Z101): It is constituted by at least one capacitive impedance component, especially by the capacitors (C100), whereof the number of the first impedance can be one or more than one;

A second impedance (Z102): It is constituted by at least one inductive impedance components (I200), whereof the number of the second impedance can be one or more than one;

At least one first impedance (Z101) and at least one second impedance (Z102) are in series connection, whereof the two ends of them after series connection are for inputting:

(1) DC pulsed power; or (2) The DC pulsed power with constant or variable voltage and constant or variable periods converted from DC power source; or (3) The DC pulsed power with constant or variable voltage and constant or variable periods converted from DC power which is further rectified from AC power; or (4) The half-wave or full-wave DC pulsed power rectified from AC power with constant or variable voltage and constant or variable frequency;

By taking advantage of aforementioned power, the bi-directional divided power in series resonance is formed at the series connected first and second impedance components, whereof the divided power is provided to drive at least one bi-directional conducting light emitting diode set (L100);

The series resonance frequency of the first impedance (Z101) and the second impedance (Z102) in series connection is the same as the pulse period of the pulsed power from power source, thereby to appear series resonance status;

A bi-directional conducting light emitting diode set (L100): it is constituted by at least one first light emitting diode (LED101) and at least one second light emitting diode (LED102) in parallel connection of inverse polarities, whereof the numbers of the first light emitting diode (LED101) and the numbers of the second light emitting diode (LED102) can be the same or different, further, the first light emitting diode (LED101) and the second light emitting diode (LED102) can be respectively constituted by one forward current polarity light emitting diode; or two or more than two forward current polarity light emitting diodes in series or parallel connections; or three or more than three forward current polarity light emitting diodes in series or parallel connections or in series and parallel connections; the bi-directional conducting light emitting diode set (L100) can be optionally installed with one or more than one sets as needed to be parallel connected across the two ends of both or either of the first impedance (Z101) or the second impedance (Z102), whereof through the power input, the divided power is formed at the two ends of both the first impedance (Z101) and the second impedance (Z102), thereby to drive the bi-directional conducing light emitting diode set (L100) which is parallel connected across the two ends of the first impedance (Z101) or the second impedance (Z102) to emit light; or At least one bi-directional conducting light emitting diode set (L100) is parallel connected across the two ends of at least one second impedance (Z102), i.e. to be parallel connected across the two ends of the inductive impedance component (I200) which constitutes the second impedance (Z102), to be driven by the bi-directional divided power in series resonance across the two ends of the inductive impedance component, while its current is limited by the impedance of the first impedance (Z101), whereof when the capacitor (C100) (such as a bi-polar capacitor) is selected to be the first impedance component, then its current is limited by the capacitive impedance.

The first impedance (Z101), the second impedance (Z102) and the bi-directional conducting light emitting diode set (L100) are connected according to the aforesaid circuit structure to constitute the bi-directional light emitting diode drive circuit (U100);

Besides, the above said bi-directional light emitting diode drive circuit (U100), in which the current distribution effect formed by the parallel connection of the bi-directional conducting light emitting diode set (L100) and the second impedance (Z102) can be used to reduce the voltage variation across the two ends of the bi-directional conducting light emitting diode set (L100) corresponding to power source.

Selection of the first light emitting diode (LED101) and the second light emitting diode (LED102) which constitute the bi-directional conducting light emitting diode set (L100) in the bi-directional light emitting diode drive circuit (U100) includes the following:

1. A first light emitting diode (LED101) which can be constituted by one light emitting diode or by more than one light emitting diodes in series connection of forward polarities, in parallel connection of the same polarity or in series and parallel connection;

2. A second light emitting diode (LED102) which can be constituted by one light emitting diode or by more than one light emitting diodes in series connection of forward polarities, in parallel connection of the same polarity or in series and parallel connection;

3. The numbers of light emitting diodes which constitute the first light emitting diode (LED101) and the numbers of light emitting diodes which constitute the second light emitting diode (LED102) can be the same or different;

4. If the number of light emitting diodes which constitute either the first light emitting diode (LED101) or the second light emitting diode (LED102) respectively is one or more than one, the connecting relationship of the respective light emitting diodes can be in the same or different series connection, parallel connection, or series and parallel connection.

Figure 3:
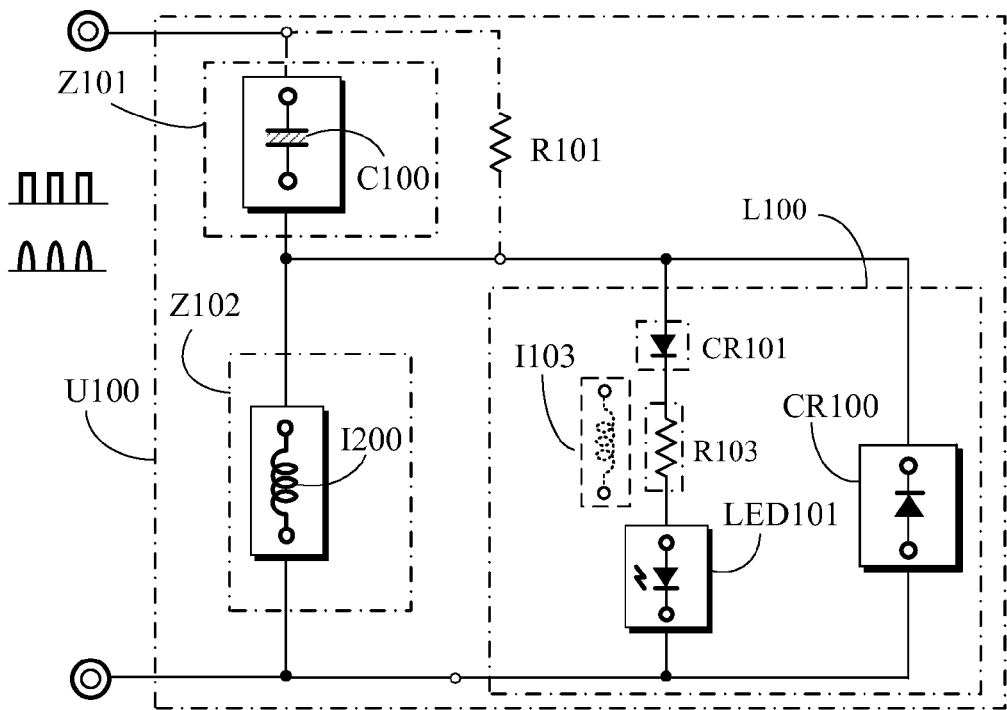
FIG. 3 is a circuit example schematic diagram of the present invention illustrating that the bi-directional conducting light emitting diode set is constituted by a first light emitting diode and a diode in parallel connection of inverse polarities.
Figure 4:
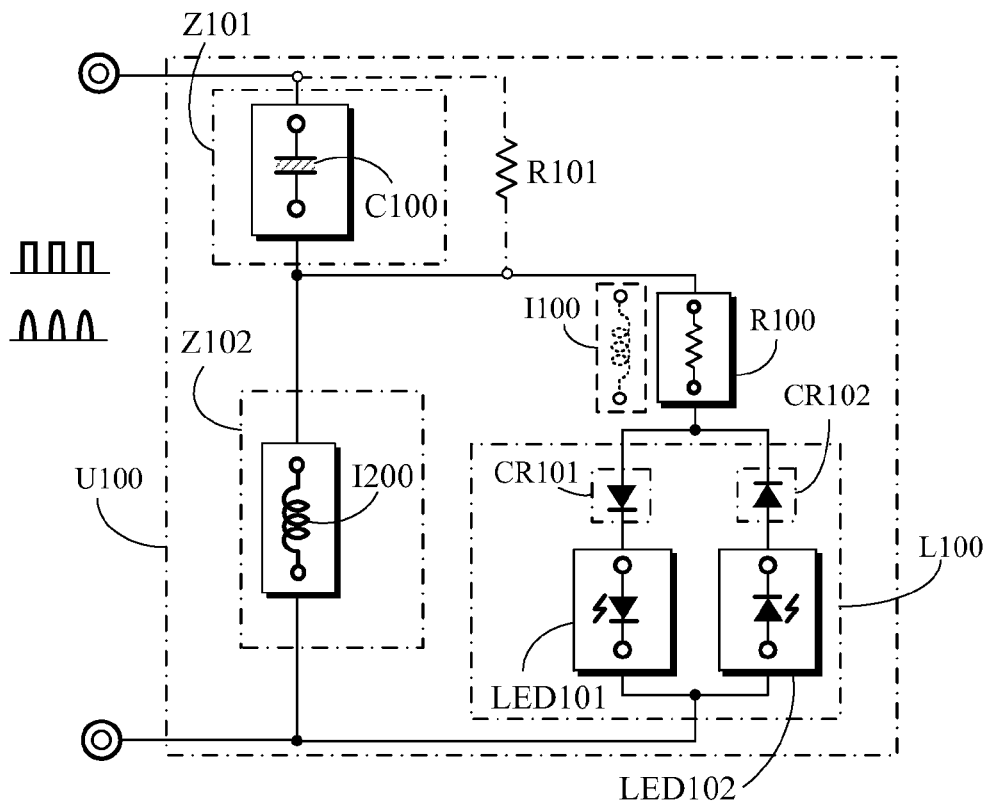
FIG. 4 is a circuit example schematic diagram illustrating that the bi-directional conducting light emitting diode set is series connected with a current limit resistor.
Figure 5:
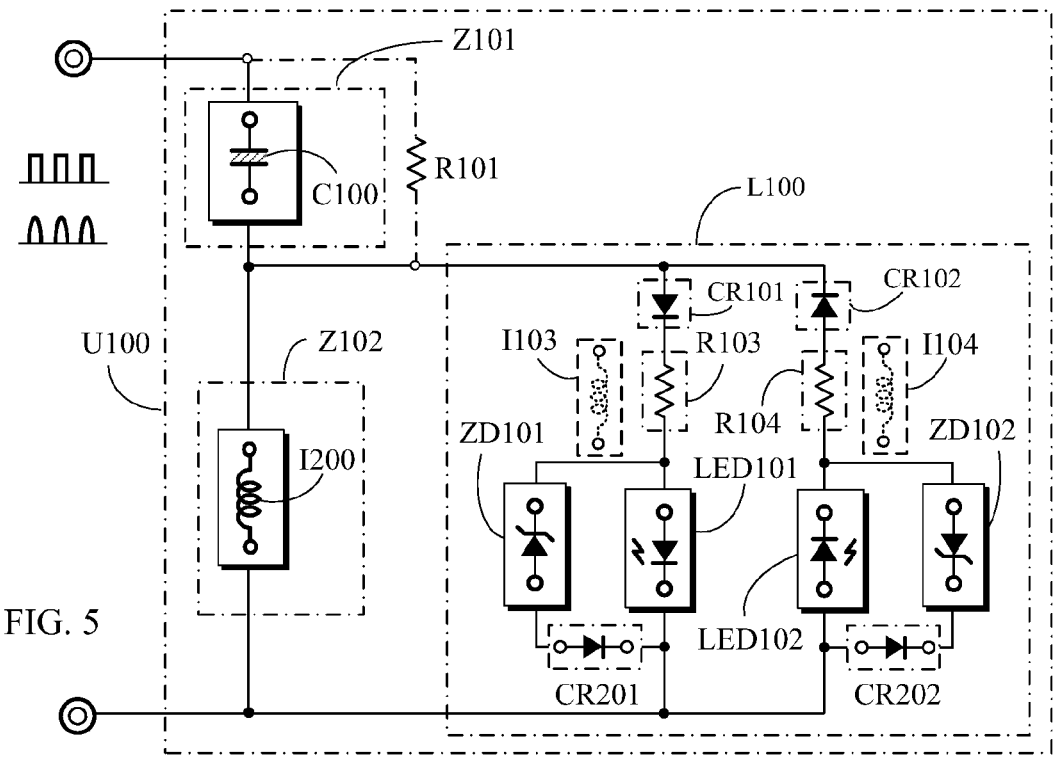
FIG. 5 is a circuit example schematic diagram illustrating that the bi-directional conducting light emitting diode set is further installed with a zener diode in the circuit of FIG. 2.
Figure 6:
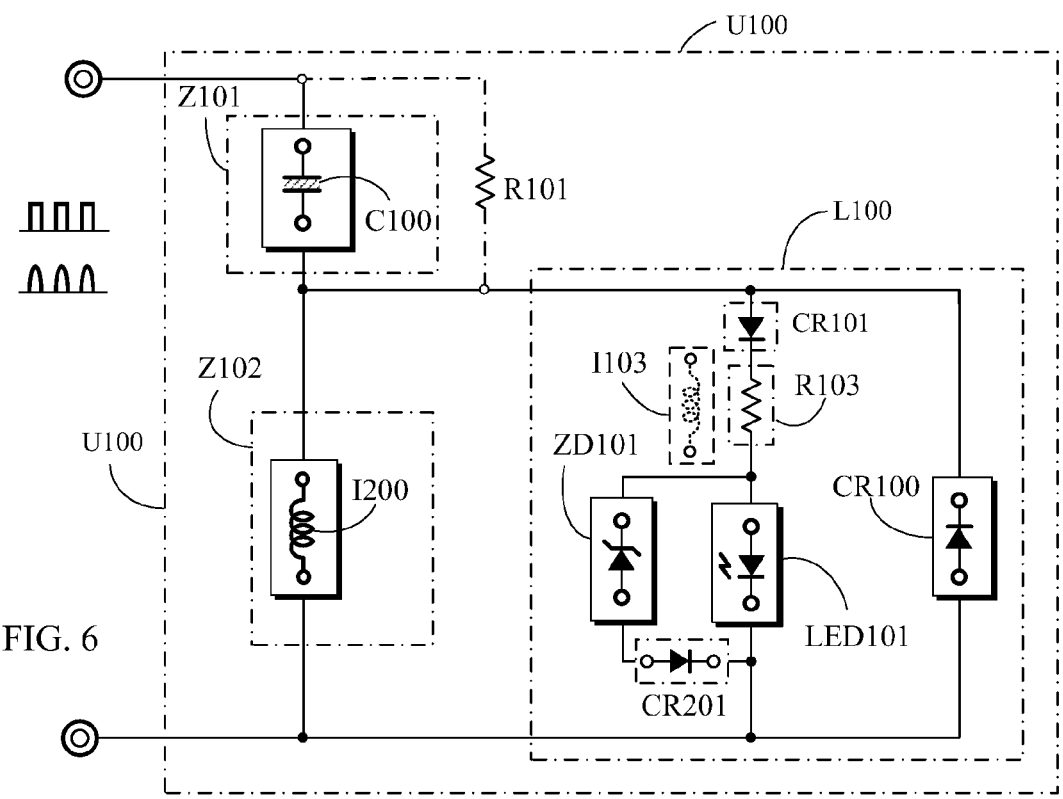
FIG. 6 is a circuit example schematic diagram illustrating that the bi-directional conducting light emitting diode set is further installed with a zener diode in the circuit of FIG. 3.
Figure 7:
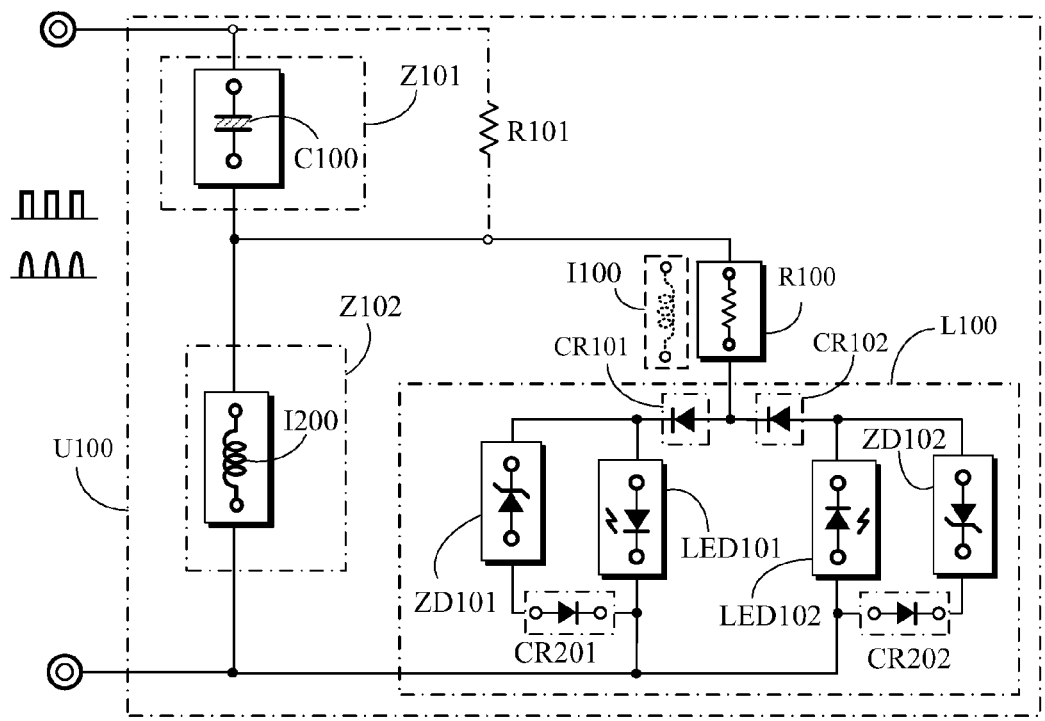
FIG. 7 is a circuit example schematic diagram illustrating that the bi-directional conducting light emitting diode set is further installed with a zener diode in the circuit of FIG. 4.

5. Either one of the first light emitting diode (LED101) and the second light emitting diode (LED102) can be replaced by a diode (CR100) while the current direction of the diode (CR100) and the working current direction of the reserved first light emitting diode (LED101) or the second light emitting diode (LED102) are in parallel connection of inverse polarities;

As shown in FIG. 3 is a circuit example schematic diagram of the present invention illustrating that the bi-directional conducting light emitting diode set is constituted by a first light emitting diode and a diode in parallel connection of inverse polarities;

The bi-directional light emitting diode drive circuit in pulsed power series resonance is operated through the bi-directional light emitting diode drive circuit (U100) to execute the circuit function, whereof in practical applications, as shown in FIGS. 1, 2 and 3, the following auxiliary circuit components can be optionally selected as needed to be installed or not installed while the quantity of the installation can be constituted by one or more than one, whereof in case more than one are selected, they can be selected based on circuit function requirements to be in series connection or parallel connection or series and parallel connection in corresponding polarities, whereof the optionally selected auxiliary circuit components include:

(1) A diode (CR101): It is optionally installed to series connected with the first light emitting diode (LED101), whereby to prevent reverse over-voltage, whereof it can be constituted by one or by more than one in series connection or parallel connection or series and parallel connection;

(2) A diode (CR102): It is optionally installed to series connected with the second light emitting diode (LED102), whereby to prevent reverse over-voltage, whereof it can be constituted by one or by more than one in series connection or parallel connection or series and parallel connection;

(3) The discharge resistor (R101): it is an optionally installed component, whereof it is parallel connected across the two ends of the capacitor (C100) which constitutes the first impedance (Z101) to release the residual charge of capacitor (C100), whereof it can be constituted by one or by more than one in series connection or parallel connection or series and parallel connection;

(4) A current limit resistor (R103): It is an optionally installed component which is series connected with the first light emitting diode (LED101) of the bi-directional conducting light emitting diode set (L100) individually, whereby to limit the current passing through the first light emitting diode (LED101), whereof the current limit resistor (R103) can also be replaced by an inductive impedance (I103), whereof it can be constituted by one or by more than one in series connection or parallel connection or series and parallel connection;

(5) A current limit resistor (R104): It is an optionally installed component which is series connected with the second light emitting diode (LED102) of the bi-directional conducting light emitting diode set (L100) individually, whereby to limit the current passing through the second light emitting diode (LED102), whereof the current limit resistor (R104) can also be replaced by an inductive impedance (I104), whereof it can be constituted by one or by more than one in series connection or parallel connection or series and parallel connection;

(6) The bi-directional light emitting diode drive circuit (U100) in series resonance, in which if the first light emitting diode (LED101) and the second light emitting diode (LED102) which constitute the bi-directional conducting light emitting diode set (L100) are simultaneously installed with the current limit resistors (R103) and (R104) respectively, a current limit resistor (R100) can be directly series connected with the bi-directional conducting light emitting diode set (L100) to replace or to be installed with the current limit resistors (R103) and (R104), whereof the current limit resistor (R100) can also be replaced by an inductive impedance component (I100);

The bi-directional light emitting diode drive circuit (U100) is constituted by the said circuit structure and selection of auxiliary circuit components as shown in FIG. 4 which is a circuit example schematic diagram illustrating that the bi-directional conducting light emitting diode set is series connected with a current limit resistor;

In addition, to protect the light emitting diode and to avoid the light emitting diode (LED101) being damaged or reduced working life by abnormal voltage, the bi-directional light emitting diode drive circuit (U100) can be further parallel connected a zener diode across the two ends of the first light emitting diode (LED101) or the second light emitting diode (LED102) of the bi-directional conducting light emitting diode set (L100), or the zener diode can be first series connected with at least one diode to produce the function of zener voltage effect, then parallel connected across the two ends of the first light emitting diode (LED101) or the second light emitting diode (LED102);

FIG. 5 is a circuit example schematic diagram illustrating that the bi-directional conducting light emitting diode set is further installed with a zener diode in the circuit of FIG. 2;

FIG. 6 is a circuit example schematic diagram illustrating that the bi-directional conducting light emitting diode set is further installed with a zener diode in the circuit of FIG. 3;

FIG. 7 is a circuit example schematic diagram illustrating that the bi-directional conducting light emitting diode set is further installed with a zener diode in the circuit of FIG. 4, whereof as shown in FIGS. 5, 6 and 7, it is comprised of that:

1. A zener diode (ZD101) is parallel connected across the two ends of the first light emitting diode (LED101) of the bi-directional conducting light emitting diode set (L100), whereof their polarity relationship is that the zener voltage of the zener diode (ZD101) is used to limit the working voltage across the two ends of the first light emitting diode (LED101);

The said zener diode (ZD101) can be optionally series connected with a diode (CR201) as needed, the advantages are 1) the zener diode (ZD101) can be protected from reverse current; 2) both diode (CR201) and zener diode (ZD101) have temperature compensation effect.

2. If the second light emitting diode (LED102) is selected for the bi-directional conducting light emitting diode set (L100), the two ends of the second light emitting diode (LED102) can be optionally parallel connected with a zener diode (ZD102) as needed, whereof their polarity relationship is that the working voltage of the second light emitting diode (LED102) is limited by the zener voltage of the zener diode (ZD102);

The said zener diode (ZD102) can be optionally series connected with a diode (CR202) as needed, the advantages are 1) the zener diode (ZD102) can be protected from reverse current; 2) both diode (CR202) and zener diode (ZD102) have temperature compensation effect.

The bi-directional light emitting diode drive circuit in pulsed power series resonance, in which if the bi-directional conducting light emitting diode set (L100) in the bi-directional light emitting diode drive circuit (U100) is selected to be constituted by a first light emitting diode (LED101) and a second light emitting diode (LED102) in parallel connection at opposite directions, it is comprised of that:

A zener diode (ZD101) can be optionally parallel connected across the two ends of the first light emitting diode (LED101) as needed, and a zener diode (ZD102) can be optionally parallel connected across the two ends of the second light emitting diode (LED102), whereof their polarity relationships are that the working voltage across the two ends of the light emitting diode (LED101) is limited by the zener diode (ZD101) while the working voltage across the two ends of the light emitting diode (LED102) is limited by the zener diode (ZD102);

The aforesaid zener diode is constituted by:

(1) A zener diode (ZD101) is parallel connected across the two ends of the first light emitting diode (LED101) of the bi-directional conducting light emitting diode set (L100), and a zener diode (ZD102) is parallel connected across the two ends of the second light emitting diode (LED102); or (2) The two zener diodes (ZD101) and (ZD102) are series connected in opposite directions, then further parallel connected across the two ends of the bi-directional conducting light emitting diode set (L100); or (3) The diode having bi-directional zener effect is parallel connected across the two ends of the bi-directional conducting light emitting diode set (L100) to replace the zener diodes (ZD101) and (ZD102).

All of the aforesaid three circuits can avoid over high end voltage of the first light emitting diode (LED101) and the second light emitting diode (LED102); or The bi-directional light emitting diode drive circuit in pulsed power series resonance, in which if the bi-directional conducting light emitting diode set (L100) in the bi-directional light emitting diode drive circuit (U100) is constituted by a first light emitting diode (LED101) and a second light emitting diode (LED102) in parallel connection at opposite directions, it is comprised of that:

The aforesaid zener diodes (ZD101) and (ZD102) can be optionally selected as needed to have the zener diode (ZD101) series connected with the diode (CR201) at forward polarity and have the zener diode (ZD102) series connected with the diode (CR202) at forward polarity, whereof the advantages are: 1) the zener diodes (ZD101), (ZD102) can be protected from reverse current; 2) both of the diode (CR201) and the first light emitting diode (ZD101) as well as both of the diode (CR202) and the zener diode (ZD102) have temperature compensation effect.

Figure 8:
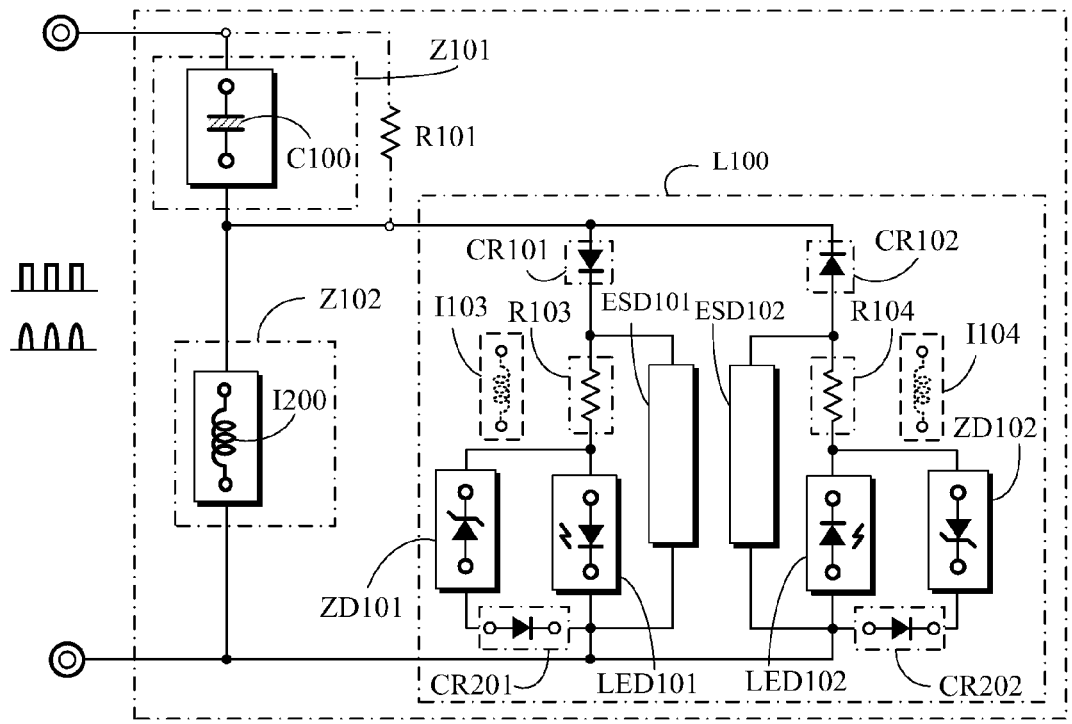
FIG. 8 is a circuit example schematic diagram illustrating that a charge/discharge device is parallel connected across the two ends of the light emitting diode and the current limit resistor in series connection in the circuit of FIG. 5.
Figure 9:
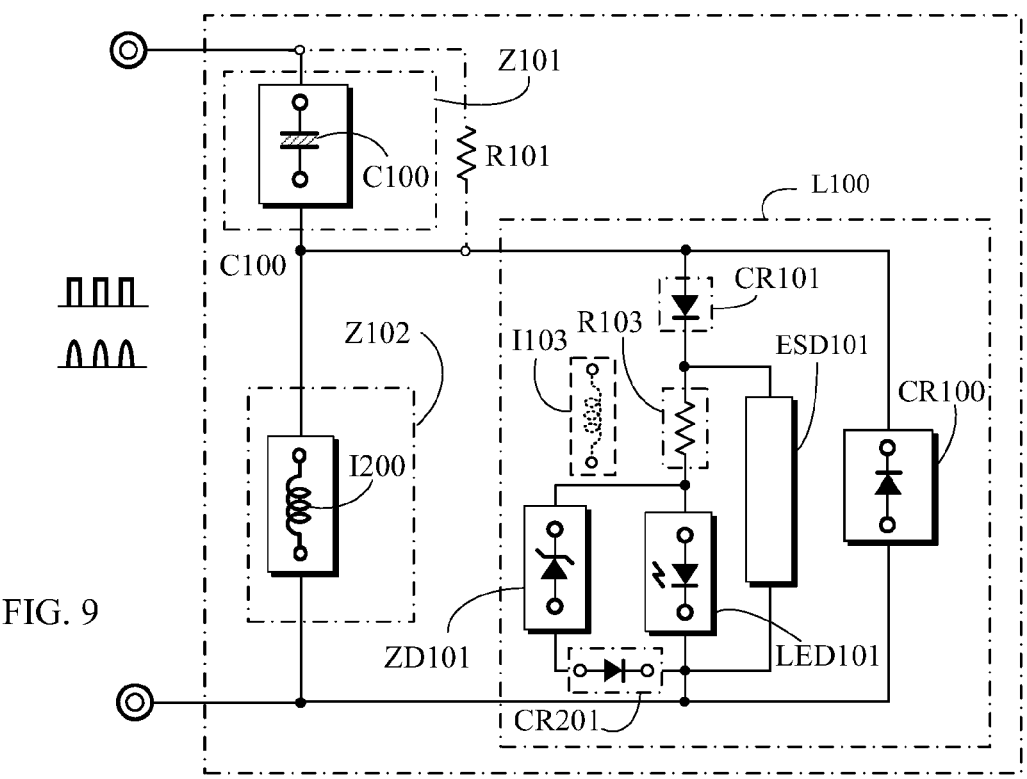
FIG. 9 is a circuit example schematic diagram illustrating that a charge/discharge device is parallel connected across the two ends of the light emitting diode and the current limit resistor in series connection in the circuit of FIG. 6.
Figure 10:
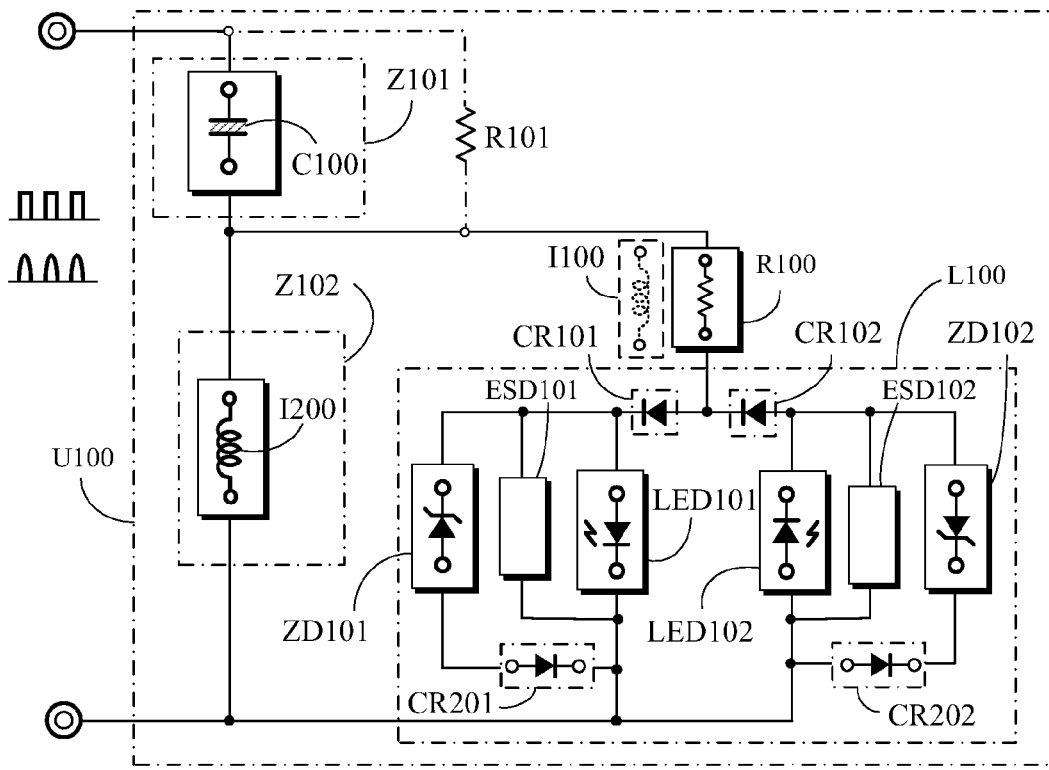
FIG. 10 is a circuit example schematic diagram illustrating that a charge/discharge device is parallel connected across the two ends of the light emitting diode in the circuit of FIG. 7.
Figure 11:
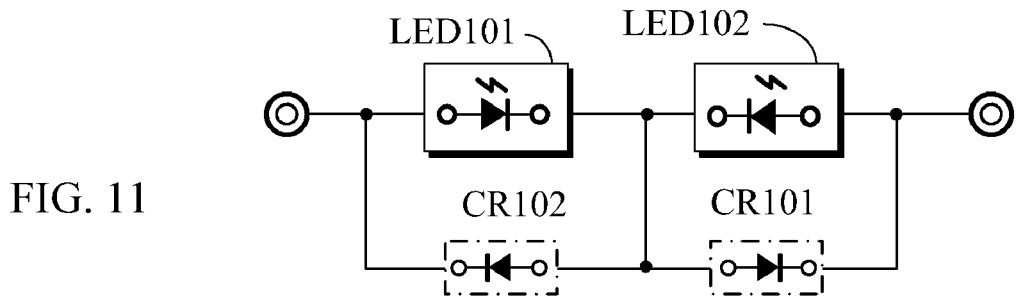
FIG. 11 is a circuit example schematic diagram of the bi-directional conducting light emitting diode set of the present invention illustrating that the first light emitting diode is reversely parallel connected with a diode, and the second light emitting diode is reversely parallel connected with a diode, whereby the two appear in series connection of opposite directions.

The bi-directional light emitting diode drive circuit (U100) of the bi-directional light emitting diode drive circuit in pulsed power series resonance as shown in the circuit examples of FIGS. 8, 9 and 10, whereof to promote the lighting stability of the light source produced by the light emitting diode, the first light emitting diode (LED101) can be installed with a charge/discharge device (ESD101), or the second light emitting diode (LED102) can be installed with a charge/discharge device (ESD102), whereof the charge/discharge device (ESD101) and (ESD102) have the random charging or discharging characteristics which can stabilize the lighting stability of the first light emitting diode (LED101) and the second light emitting diode (LED102), whereby to reduce their lighting pulsations; the aforesaid charge/discharge devices (ESD101), (ESD102) can be constituted by the conventional charging and discharging batteries, or super-capacitors or capacitors, etc;

The bi-directional light emitting diode drive circuit in pulsed power series resonance can be further optionally installed with charge/discharge device as needed, whereof it includes:

1. The bi-directional light emitting diode drive circuit in pulsed power series resonance, whereof in its bi-directional light emitting diode drive circuit (U100), a charge/discharge device (ESD101) can be parallel connected across the two ends of the current limit resistor (R103) and the first light emitting diode (LED101) in series connection;

Or a charge/discharge device (ESD102) can be further parallel connected across the two ends of the current limit resistor (R104) and the second light emitting diode (LED102) in series connection;

FIG. 8 is a circuit example schematic diagram illustrating that a charge/discharge device is parallel connected across the two ends of the first and second light emitting diodes and the current limit resistor in series connection in the circuit of FIG. 5, whereof it is comprised of:

A charge/discharge device (ESD101) based on its polarity is parallel connected across the two ends of the first light emitting diode (LED101) and the current limit resistor (R103) in series connection, or is directly parallel connected across the two ends of the first light emitting diode (LED101), whereof the charge/discharge device (ESD101) has the random charge/discharge characteristics to stabilize the lighting operation and to reduce the lighting pulsation of the first light emitting diode (LED101);

If the second light emitting diode (LED102) is selected, a charge/discharge device (ESD102) based on its polarity is parallel connected across the two ends of the second light emitting diode (LED102) and the current limit resistor (R104) in series connection, whereof the charge/discharge device (ESD102) has the random charge/discharge characteristics to stabilize the lighting operation and to reduce the lighting pulsation of the second light emitting diode (LED102);

The aforesaid charge/discharge devices (ESD101), (ESD102) can be constituted by the conventional charging and discharging batteries, or super-capacitors or capacitors, etc;

2. The bi-directional light emitting diode drive circuit in pulsed power series resonance, whereof if a first light emitting diode (LED101) is selected and is reversely parallel connected with a diode (CR100) in the bi-directional light emitting diode drive circuit (U100), its main circuit structure is as shown in FIG. 9 which is a circuit example schematic diagram illustrating that a charge/discharge device is parallel connected across the two ends of the light emitting diode and the current limit resistor in series connection in the circuit of FIG. 6, whereof a charge/discharge device (ESD101) based on its polarity is parallel connected across the two ends of the first light emitting diode (LED101) and the current limit resistor (R103) in series connection, whereof the charge/discharge device (ESD101) has the random charge/discharge characteristics to stabilize the lighting operation and to reduce the lighting pulsation of the first light emitting diode (LED101);

The aforesaid charge/discharge devices (ESD101), (ESD102) can be constituted by the conventional charging and discharging batteries, or super-capacitors or capacitors, etc;

3. In the bi-directional light emitting diode drive circuit (U100) of the bi-directional light emitting diode drive circuit in pulsed power series resonance, when the current limit resistor (R100) is selected to replace the current limit resistors (R103), (R104) for the common current limit resistor of the bi-directional conducting light emitting diode set (L100), or the current limit resistors (R103), (R104) and (R100) are not installed, the main circuit structure is as shown in FIG. 10 which is a circuit example schematic diagram illustrating that a charge/discharge device is parallel connected across the two ends of the light emitting diode and the current limit resistor in series connection in the circuit of FIG. 7, whereof it is comprised of that:

A charge/discharge device (ESD101) is directly parallel connected across the two ends of the first light emitting diode (LED101) at the same polarity, and a charge/discharge device (ESD102) is directly parallel connected across the two ends of the first light emitting diode (LED102) at the same polarity, whereof the charge/discharge devices (ESD101) and (ESD102) has the random charge or discharge characteristics;

The aforesaid charge/discharge devices (ESD101), (ESD102) can be constituted by the conventional charging and discharging batteries, or super-capacitors or capacitors, etc;

The bi-directional light emitting diode drive circuit in pulsed power series resonance, in which the charge/discharge devices (ESD101) or (ESD102) in the bi-directional light emitting diode drive circuit (U100) have the characteristics of uni-polarity, thereby after parallel connection of the first light emitting diode (LED101) and the uni-polar charge/discharge device (ESD101), a diode (CR101) in series connection at forward polarity can be optionally installed to prevent the uni-polar charge/discharge device from damage by reverse voltage; and after parallel connection of the second light emitting diode (LED102) and the uni-polar charge/discharge device (ESD102), a diode (CR102) in series connection at forward polarity can be optionally installed to prevent the uni-polar charge/discharge device from damage by reverse voltage. The above said charge/discharge devices (ESD101), (ESD102) are constituted by conventional charge/discharge batteries, or super-capacitors or capacitors;

The bi-directional conducting light emitting function of the diode in the said bi-directional conducting light emitting diode set (L100) is constituted by that:

(1) It is constituted by at least one first light emitting diode (LED101) and at least one second light emitting diode (LED102) in parallel connection of inverse polarities;

(2) At least one first light emitting diode (LED101) is series connected with a diode (CR101) in forward polarity, and at least one second light emitting diode (LED102) is series connected with a diode (CR102) in forward polarity, thereby the two are further parallel connected in inverse polarities;

(3) A diode (CR101) is parallel connected with at least one first light emitting diode (LED101) in inverse polarities, and a diode (CR102) is parallel connected with at least one second light emitting diode (LED102) in inverse polarities, whereof the two are further series connected in opposite directions to constitute a bi-directional conducting light emitting diode set, whereof it is as shown in FIG. 11 which is a circuit example schematic diagram of the bi-directional conducting light emitting diode set of the present invention illustrating that the first light emitting diode is reversely parallel connected with a diode, and the second light emitting diode is reversely parallel connected with a diode, whereby the two appear in series connection of opposite directions.

(4) Or it can be constituted by conventional circuit combinations or components which enables the light emitting diode to receive power and to emit light bi-directionally.

The first impedance (Z101), the second impedance (Z102), the bi-directional conducting light emitting diode set (L100), the first light emitting diode (LED101), the second light emitting diode (LED102) and the various aforesaid optional auxiliary circuit components as shown in the circuit examples of FIGS. 1~11 can be optionally installed or not installed as needed based on application needs, whereof the installation quantity include constitution by one, wherein if more than one are selected in the application, the corresponding polarity relationship shall be determined based on circuit function requirement to execute series connection or parallel connection or series and parallel connections; thereof it is constituted as the following:

1. The first impedance (Z101) can be constituted by a capacitor (C100), or by more than one capacitors (C100) in series connection or parallel connection or series and parallel connection;

2. The second impedance (Z102) can be constituted by an inductive impedance component (I200), or by more than one inductive impedance component (I200) in series connection or parallel connection or series and parallel connection;

3. The first light emitting diode (LED101) can be constituted by one light emitting diode, or by more than one light emitting diodes in series connection of forward polarities, or parallel connection of the same polarity, or in series and parallel connection;

4. The second light emitting diode (LED102) can be constituted by one light emitting diode, or by more than one light emitting diodes in series connection of forward polarities, or parallel connection of the same polarity, or in series and parallel connection;

5. In the bi-directional light emitting diode drive circuit (U100):

(1) It can be optionally installed with one set or more than one sets of bi-directional conducting light emitting diode sets (L100) in series connection, parallel connection or series and parallel connection, whereof if one set or more than one sets are selected to be installed, they can be jointly driven by the divided power of a common second impedance (Z102) or driven individually by the divided power at the corresponding one of the multiple second impedances (Z102) which are in series connection or parallel connection;

(2) If the charge/discharge device (ESD101) or (ESD102) is installed in the bi-directional light emitting diode drive circuit (U100), the light emitting diodes (LED101) or (LED102) in the bi-directional conducting light emitting diode set (L100) is relied on the continuous DC power to emit light;

(3) If the charge/discharge device (ESD101) or (ESD102) is not installed, then current conduction to light emitting diode (LED101) or (LED102) is intermittent, whereby referring to the inputted voltage wave shape and duty cycle of current conduction, the light emitting forward current and the peak of light emitting forward voltage of each light emitting diode in the bi-directional conducting light emitting diode set (L100) can be correspondingly selected for the light emitting diode (LED101) or (LED102), whereof the selections include the following:

1) The light emitting peak of forward voltage is lower than the rated forward voltage of light emitting diode (LED101) or (LED102); or 2) The rated forward voltage of light emitting diode (LED101) or (LED102) is selected to be the light emitting peak of forward voltage; or 3) If current conduction to light emitting diode (LED101) or (LED102) is intermittent, the peak of light emitting forward voltage can be correspondingly selected based on the duty cycle of current conduction as long as the principle of that the peak of light emitting forward voltage does not damage the light emitting diode (LED101) or (LED102) is followed; or 4) Based on the value and wave shape of the aforesaid light emitting forward voltage, the corresponding current value and wave shape from the forward voltage vs. forward current ratio are produced; however the peak of light emitting forward current shall follow the principle not to damage the light emitting diode (LED101) or (LED102); or 5) The luminosity or the stepped or step-less luminosity modulation of the forward current vs. relative luminosity can be controlled based on the aforesaid value and wave shape of forward current.

Figure 12:
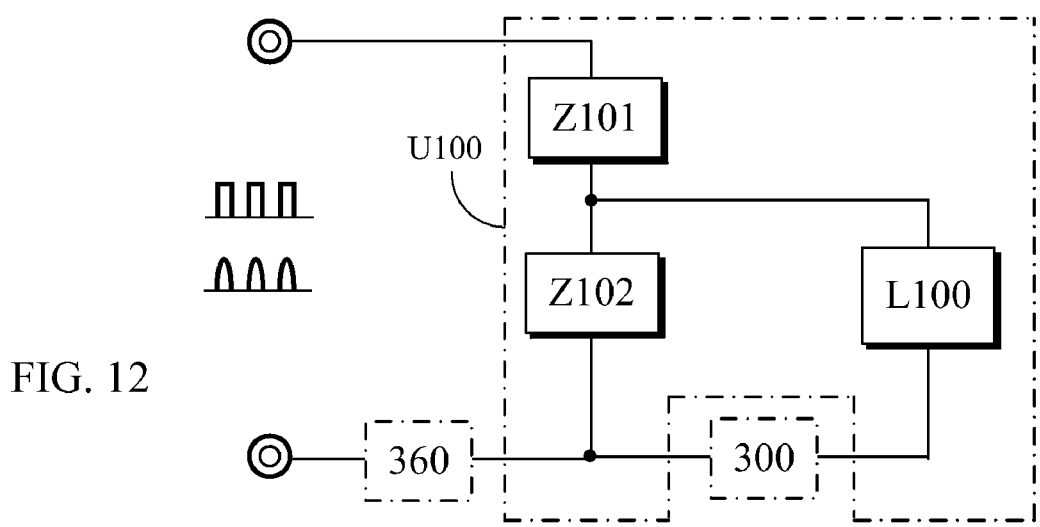
FIG. 12 is a circuit example schematic block diagram of the present invention which is series connected to the power modulator of series connection type.
Figure 13:
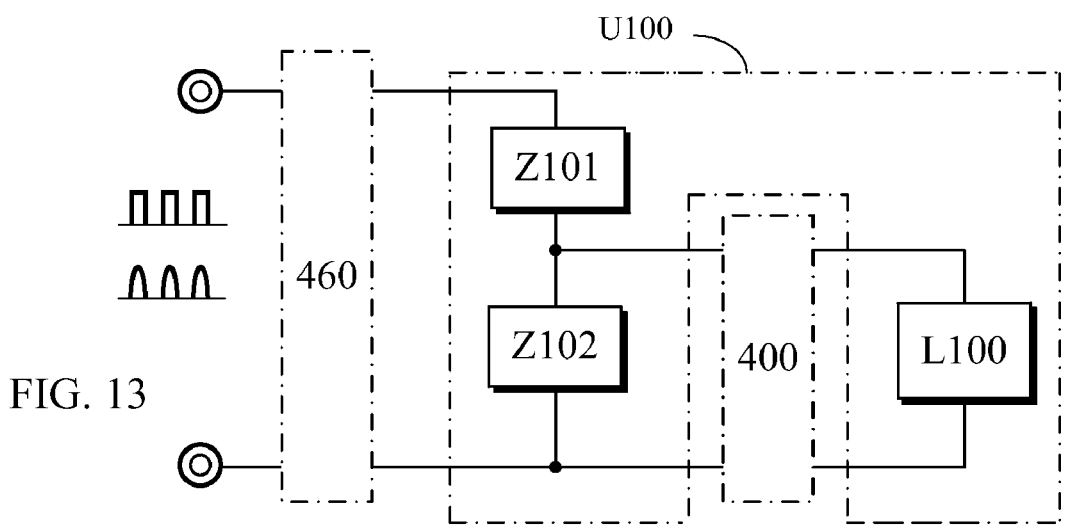
FIG. 13 is a circuit example schematic block diagram of the present invention which is parallel connected to the power modulator of parallel connection type.
Figure 14:
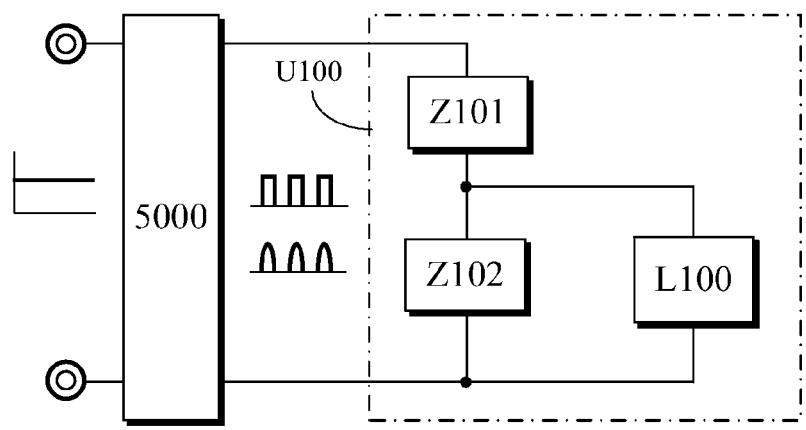
FIG. 14 is a circuit example schematic block diagram of the present invention driven by the DC to DC converter output power.

6. The diode (CR100), diode (CR101), diode (CR102), diode (CR201) and diode (CR202) can be constituted by one diode, or by more than one diodes in series connection of forward polarities, or in parallel connection of the same polarity, or in series and parallel connection, whereof the said devices can be optionally installed as needed;

7. The discharge resistor (R101), the current limit resistor (R100), the current limit resistor (R103), and the current limit resistor (R104) can be constituted by one resistor, or by more than one resistors in series connection or in parallel connection or in series and parallel connection, whereof the said devices can be optionally installed as needed;

8. The inductive impedance component (I100), the inductive impedance component (I103), and the inductive impedance component (I104) can be constituted by one impedance component, or by more than one impedance components in series connection or in parallel connection or in series and parallel connection, whereof the said devices can be optionally installed as needed;

9. The zener diode (ZD101) or the zener diode (ZD102) can be constituted by one zener diode, or by more than one zener diodes in series connection of forward polarities, or in parallel connection of the same polarity, or in series and parallel connection, whereof the said devices can be optionally installed as needed;

10. The charge/discharge devices (ESD101), (ESD102) can be constituted by one, or by more than one in series connection of forward polarities, or in parallel connection of the same polarity, or in series and parallel connection, whereof the said devices can be optionally installed as needed;

The bi-directional light emitting diode drive circuit in pulsed power series resonance of the present invention can be inputted by the following types of pulsed power, whereof it includes:

(1) DC pulsed power; or (2) The DC pulsed power with constant or variable voltage and constant or variable periods converted from DC power source; or (3) The DC pulsed power with constant or variable voltage and constant or variable periods converted from DC power which is further rectified from AC power; or (4) The half-wave or full-wave DC pulsed power rectified from AC power with constant or variable voltage and constant or variable frequency;

The bi-directional light emitting diode drive circuit in pulsed power series resonance of the present invention can be further optionally combined with the following active circuit modulator devices as needed, whereof the various applied circuits are the following:

1. FIG. 12 is a circuit example schematic block diagram of the present invention which is series connected to the bi-directional power modulator of series connection type, whereof the bi-directional power modulator is constituted by the following:

A bi-directional power modulator of series connection type (300), which is constituted by the conventional electromechanical components or solid state power components and related electronic circuit components to modulate the bi-directional power output;

A DC power modulator of series connection type (360), which is constituted by conventional electromechanical components or solid state power components and related electronic circuit components to modulate the bi-directional power output;

The circuit function operations are the following:

(1) The DC power modulator of series connection type (360) can be optionally installed as needed to be series connected with the bi-directional light emitting diode drive circuit (U100), whereby to receive the pulsed power from the power source, whereof the pulsed power is modulated by the power modulator of series connection type (360) to execute power modulations such as pulse width modulation or current conduction phase angle control, or impedance modulation, etc. to drive the bi-directional light emitting diode drive circuit (U100); or (2) The bi-directional power modulator of series connection type (300) can be optionally installed as needed to be series connected between the second impedance (Z102) and the bi-directional conducting light emitting diode set (L100), whereby the bi-directional divided power in series resonance across the two ends of the second impedance (Z102) is modulated by the bi-directional power modulator of series connection type (300) to execute power modulations such as pulse width modulation or current conduction phase angle control, or impedance modulation, etc. to drive the bi-directional conducting light emitting diode set (L100);

2. FIG. 13 is a circuit example schematic block diagram of the present invention which is parallel connected to the bi-directional power modulator of parallel connection type, whereof the bi-directional power modulator of the parallel connection type is constituted by the following:

The bi-directional power modulator of parallel connection type (400) which is constituted by conventional electromechanical components or solid state power components and related electronic circuit components to modulate the bi-directional power output;

A DC power modulator of parallel connection type (460) is constituted by conventional electromechanical components or solid state power components and related electronic circuit components to modulate the bi-directional power output;

The circuit operating functions are the following:

(1) The DC power modulator of parallel connection type (460) can be optionally installed as needed, whereof its output ends are for parallel connection with the bi-directional light emitting diode drive circuit (U100), while its input ends are provided for receiving the pulsed power from the power source, whereby the pulsed power is modulated by the DC power modulator of parallel connection type (460) to execute power modulations such as pulse width modulation or current conduction phase angle control, or impedance modulation, etc. to drive the bi-directional light emitting diode drive circuit (U100); or (2) The bi-directional power modulator of parallel connection type (400) can be optionally installed as needed, whereof its output ends are parallel connected with the input end of the bi-directional conducting light emitting diode set (L100), while the input ends of the bi-directional power modulator of parallel connection type (400) are parallel connected with two ends of the second impedance (Z102), whereby the bi-directional divided power in series resonance across the two ends of the second impedance (Z102) is modulated by the bi-directional power modulator of parallel connection type (400) to execute power modulations such as pulse width modulation or current conduction phase angle control, or impedance modulation, etc. to drive the bi-directional conducting light emitting diode set (L100);

3. FIG. 14 is a circuit example schematic block diagram of the present invention which is driven by the output power from a DC to DC converter, whereof the DC to DC converter is constituted by:

A DC to DC converter (5000) which is constituted by conventional electromechanical components or solid state power components and related electronic circuit components, whereof its input ends receive DC power input while its output ends optionally provide for outputting the DC pulsed power with a constant or variable voltage and a constant or variable periods;

The circuit operating functions are the following:

A DC to DC converter (5000), in which its input ends receive DC power while its output ends provide DC pulsed power, wherein the bi-directional light emitting diode drive circuit (U100) is parallel connected with the output ends of the DC to DC converter (5000), and the input ends of the DC to DC converter receive the optionally selected DC power with constant or variable voltage, or the DC power rectified from AC power;

The output ends of the DC to DC converter (5000) provide output which can be optionally selected to be a DC pulsed power with constant or variable voltage and constant or variable periods to control and drive the bi-directional light emitting diode drive circuit (U100);

In addition, the bi-directional light emitting diode drive circuit (U100) can also be controlled and driven by regulating the output power of the DC to DC converter (5000), or by executing pulse width modulation or current conduction phase angle control, or impedance modulation, etc to the power outputted;

4. The bi-directional light emitting diode drive circuit (U100) is series connected with a conventional impedance component (500) and is further parallel connected with the power source, whereof the impedance component (500) include:

(1) An impedance component (500): it is constituted by a component with resistive impedance characteristics; or (2) An impedance component (500): it is constituted by a component with inductive impedance characteristics; or (3) An impedance component (500): it is constituted by a component with capacitive impedance characteristics; or (4) An impedance component (500): it is constituted by a single impedance component with the combined impedance characteristics of at least two of the resistive impedance, or inductive impedance, or capacitive impedance simultaneously, thereby to provide DC or AC impedances; or (5) An impedance component (500): it is constituted by a single impedance component with the combined impedance characteristics of the capacitive impedance and inductive impedance, whereof its combined parallel resonance frequency is the same as the frequency of bi-directional power or pulse period of unidirectional pulsed power, thereby to produce a parallel resonance status; or (6) An impedance component (500): it is constituted by capacitive impedance components, or inductive impedance components, or resistive impedance components, including one or more than one kind of one and more than one impedance component, or two or more than two kinds of impedance components in series connection, or parallel connection, or series and parallel connections, thereby to provide a DC or AC impedance; or (7) An impedance component (500): it is constituted by the mutual series connection of a capacitive impedance component and an inductive impedance component, whereof its inherent series resonance frequency is the same as the frequency of bi-directional power or pulse period of unidirectional pulsed power, thereby to produce a parallel resonance status and the end voltage across two ends of the capacitive impedance component or the inductive impedance component appear in series resonance correspondingly;

Or the capacitive impedance and the inductive impedance are in mutual parallel connection, whereby its inherent parallel resonance frequency is the same as the frequency of bi-directional power or the pulse period of unidirectional pulsed power, thereby to produce a parallel resonance status and appear the corresponding end voltage.

Figure 15:
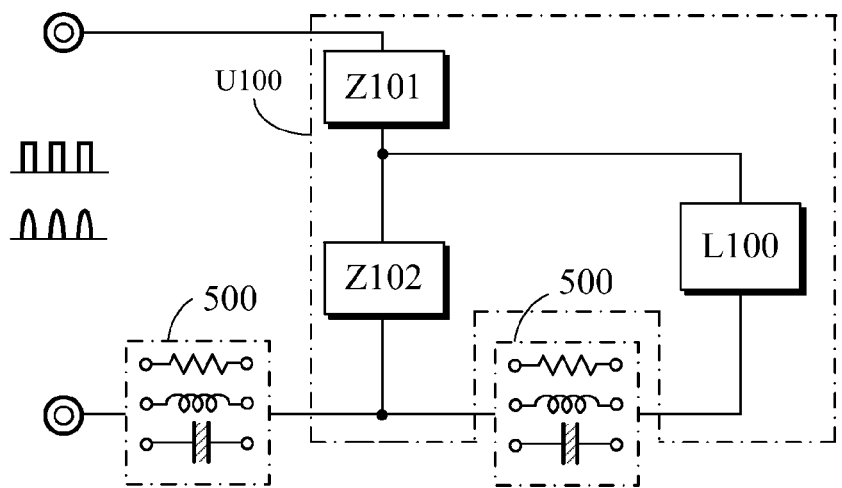
FIG. 15 is a circuit example schematic block diagram of the present invention which is series connected with impedance components.
Figure 16:
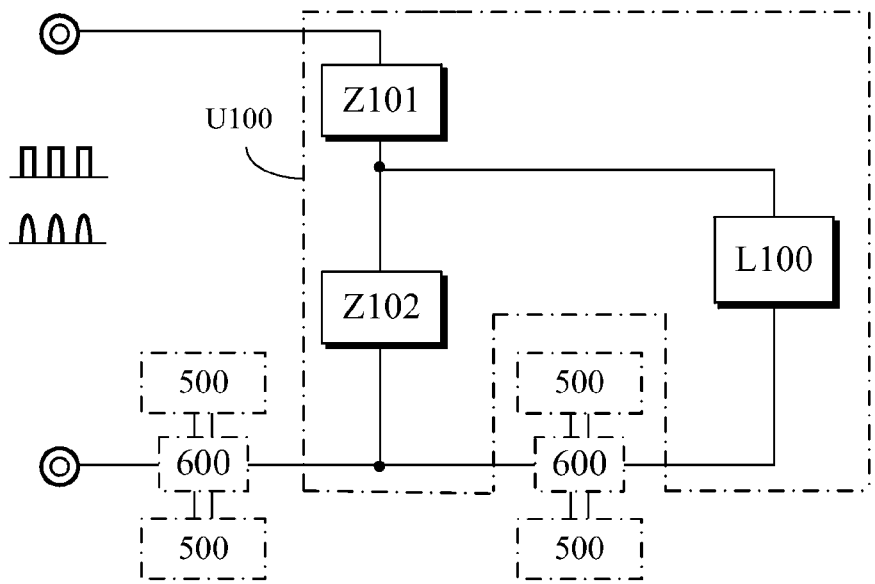
FIG. 16 is a circuit example schematic block diagram of the present invention illustrating that the impedance components in series connection execute series connection, or parallel connection, or series and parallel connection by means of the switching device.
Figure 17:
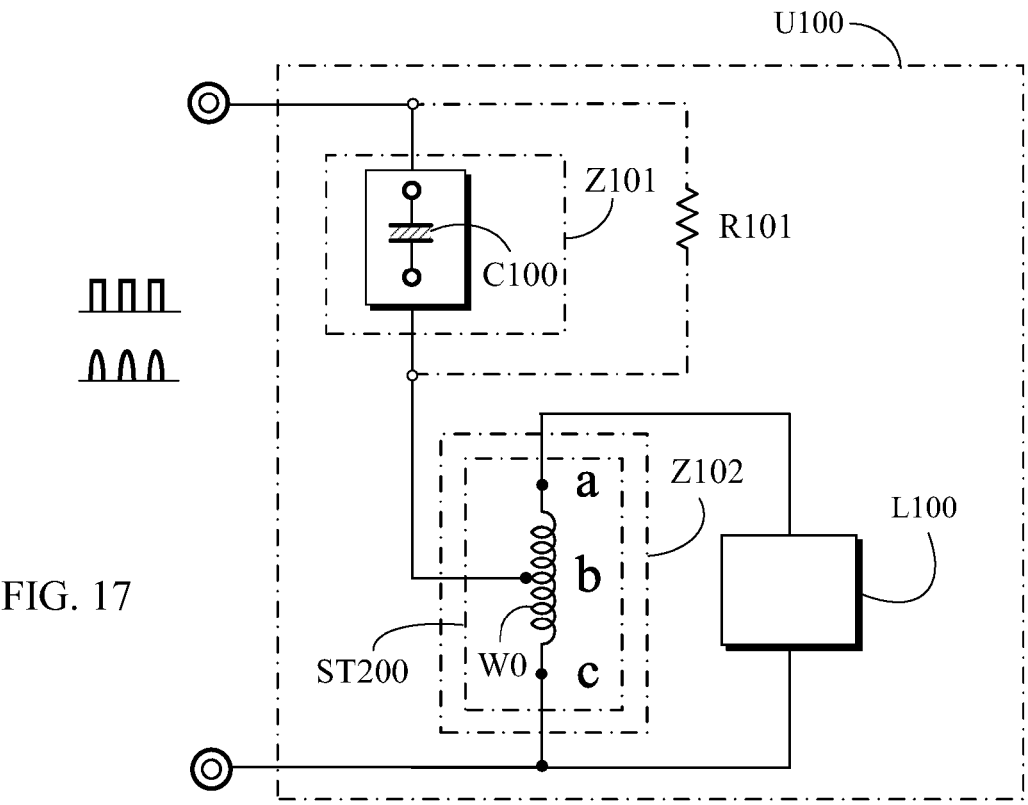
FIG. 17 is a circuit example schematic diagram of the present invention illustrating that the inductive impedance component of the second impedance is replaced by the self-coupled voltage change power supply side winding of the self-coupled transformer thereby to constitute a voltage rise.

FIG. 15 is a circuit example schematic block diagram of the present invention which is series connected with impedance components;

5. At least two impedance components (500) as said in the item 4 execute switches between series connection, parallel connection and series and parallel connection bye means of the switching device (600) which is constituted by electromechanical components or solid state components, whereby to modulate the power transmitted to the bi-directional light emitting diode drive circuit (U100), wherein FIG. 16 is a circuit example schematic block diagram of the present invention illustrating that the impedance components in series connection execute series connection, or parallel connection, or series and parallel connection by means of the switching device;

The bi-directional light emitting diode drive circuit in pulsed power series resonance of the present invention, in which the optionally installed inductive impedance component (I200) of second impedance (Z102) can be further replaced by the power supply side winding of a transformer with inductive effect, whereof the transformer can be a self-coupled transformer (ST200) with self-coupled voltage change winding or a transformer (IT200) with separated voltage change winding;

FIG. 17 is a circuit example schematic diagram of the present invention illustrating that the inductive impedance component of the second impedance is replaced by the self-coupled transformer thereby to constitute a voltage rise, whereof as shown in FIG. 17, the self-coupled transformer (ST200) has a self-coupled voltage change winding (W0) with voltage raising function, in which the b, c ends of the self-coupled voltage change winding (W0) of the self-coupled transformer (ST200) are the power supply side which replace the inductive impedance component (I200) of the second impedance (Z102) to constitute the second impedance (Z102), whereof its inherent series resonance frequency with the capacitor (C100) of the first impedance (Z101) in series connection produces a series resonance status with the pulse period of the pulsed power from the power source, whereof the a, c output ends of the self-coupled voltage change winding (W0) of the self-coupled transformer ST 200 provide AC power of voltage rise to drive the bi-directional conducting light emitting diode set (L100).

Figure 18:
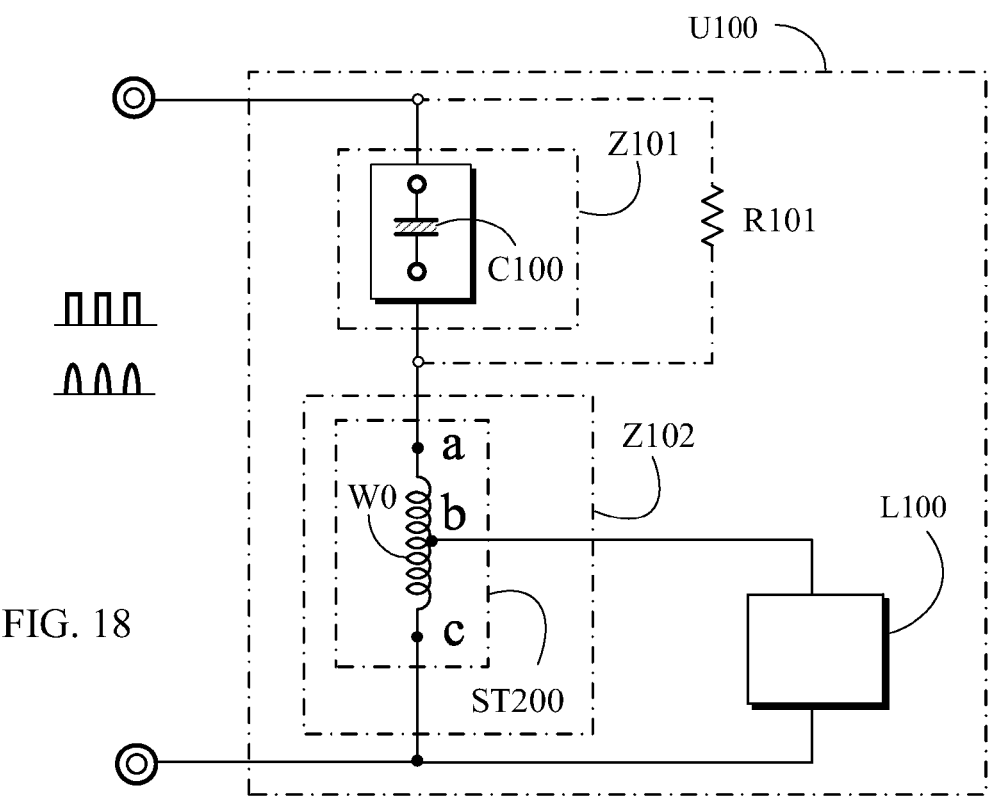
FIG. 18 is a circuit example schematic diagram of the present invention illustrating that the inductive impedance component of the second impedance is replaced by the self-coupled voltage change power supply side winding of the self-coupled transformer thereby to constitute a voltage drop.

FIG. 18 is a circuit example schematic diagram of the present invention illustrating that the inductive impedance component of the second impedance is replaced by the self-coupled voltage change power supply side winding of the self-coupled transformer thereby to constitute a voltage drop, whereof as shown in FIG. 18, the self-coupled transformer (ST200) has a self-coupled voltage change winding (W0) with voltage drop function, in which the a, c ends of the self-coupled voltage change winding (W0) of the self-coupled transformer (ST200) are the power supply side which replace the inductive impedance component (I200) of the second impedance (Z102) to constitute the second impedance (Z102), whereof its inherent series resonance frequency with the capacitor (C100) of the first impedance (Z101) in series connection produces a series resonance status with the pulse period of the pulse power from power source, whereof the b, c output taps of the self-coupled voltage change winding (W0) of the self-coupled transformer (ST200) provide AC power of voltage drop to drive the bi-directional conducting light emitting diode set (L100).

Figure 19:
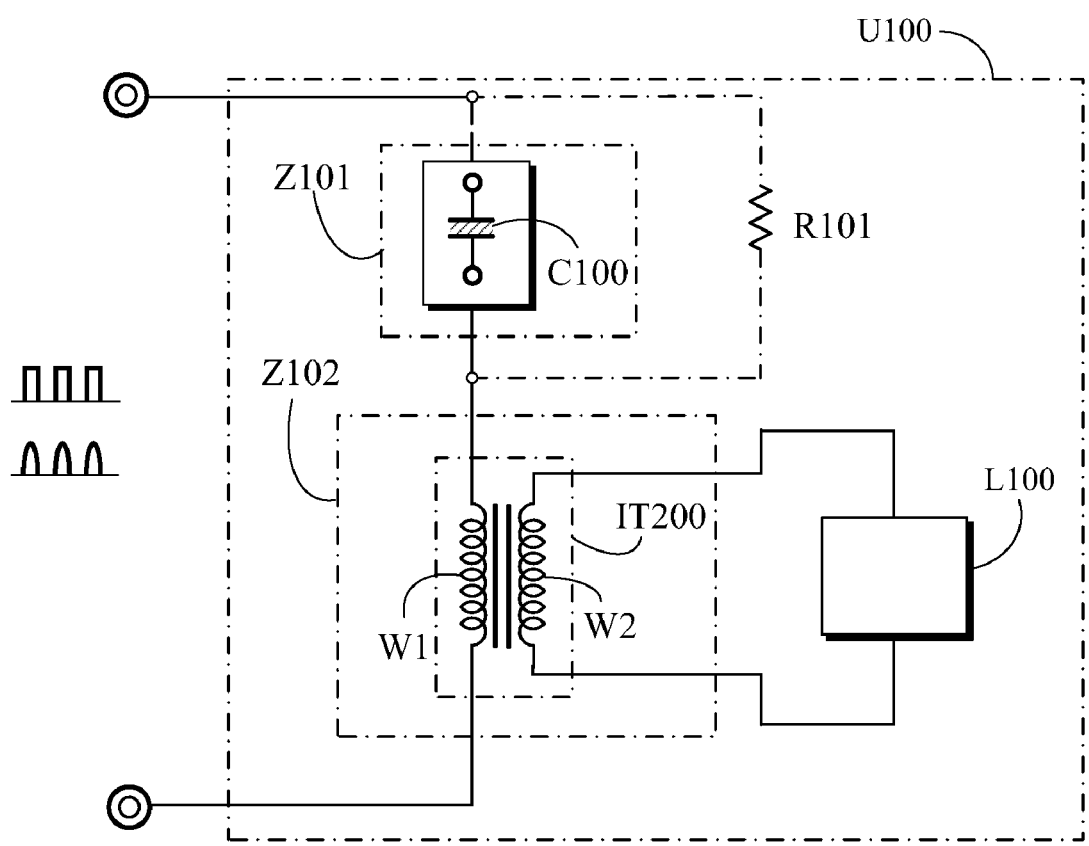
FIG. 19 is a circuit example schematic diagram of the present invention illustrating that the inductive impedance component of the second impedance is replaced by the primary side winding of the separating type transformer with separating type voltage change winding.

FIG. 19 is a circuit example schematic diagram of the present invention illustrating that the inductive impedance component of the second impedance is replaced by the primary side winding of the separating type transformer with separating type voltage change winding, whereof as shown in FIG. 19, the separating type transformer (IT200) is comprised of a primary side winding (W1) and a secondary side winding (W2), in which the primary side winding (W1) and the secondary side winding (W2) are separated, whereof the primary side winding (W1) constitutes the second impedance (Z102), whereof its inherent series resonance frequency in series connection with the capacitor (C100) of the first impedance (Z101) produces a series resonance status with the pulse period of the pulsed power from power source, whereof the output voltage of the secondary side winding (W2) of the separating type transformer (IT200) can be optionally selected to provide AC power of voltage rise or voltage drop to drive the bi-directional conducting light emitting diode set (L100).

From the above description, the inductive impedance component (I200) of the second impedance (Z102) is replaced by the power supply side winding of the transformer, while the output AC power of either voltage rise or voltage drop from the secondary side winding of the separating type transformer (IT200) is for driving the bi-directional conducting light emitting diode set (L100).

Color of the individual light emitting diodes (LED101) of the bi-directional conducting light emitting diode set (L100) in the bi-directional light emitting diode drive circuit (U100) of the bi-directional light emitting diode drive circuit in pulsed power series resonance of the present invention can be optionally selected to be constituted by one or more than one colors.

The relationships of location arrangement between the individual light emitting diodes (LED101) of the bi-directional conducting light emitting diode set (L100) in the bi-directional light emitting diode drive circuit (U100) of the bi-directional light emitting diode drive circuit in pulsed power series resonance of the present invention include the following: 1) sequentially linear arrangement; 2) sequentially distributed in a plane; 3) crisscross-linear arrangement; 4) crisscross distribution in a plane; 5) arrangement based on particular geometric positions in a plane; 6) arrangement based on 3D geometric positions.

The bi-directional light emitting diode drive circuit in pulsed power series resonance, in which the embodiments of its bi-directional light emitting diode drive circuit (U100) are constituted by circuit components which include: 1) It is constituted by individual circuit components which are inter-connected; 2) At least two circuit components are combined to at least two partial functioning units which are further inter-connected; 3) All components are integrated together to one structure.

As is summarized from above descriptions, progressive performances of power saving, low heat loss and low cost can be provided by the bi-directional light emitting diode drive circuit in pulsed power series resonance through charging/discharging the uni-polar capacitor to drive the light emitting diode.

The invention claimed is:

1. A bi-directional light emitting diode drive circuit in pulsed power series resonance, which uses an capacitive impedance component in a first impedance and an inductive impedance component in a second impedance,
wherein the inherent series resonance of the first impedance and second impedance in series connection is the same as the pulse period of the input pulsed power, thereby to generate a series resonance status; in the series resonance, the bi-directional divided power in series resonance is formed across the two ends of the capacitive impedance component or the inductive impedance component, thereby to drive a bi-directional conducting light emitting diode set which is parallel connected across the two ends of either the first impedance or the second impedance to emit light;
wherein the bi-directional light emitting diode drive circuit (U100) comprises the first impedance including capacitive impedance components, the second impedance including inductive impedance components, and at least one bi-directional light emitting diode set including parallel connected at least one first light emitting diode and at least one second light emitting diode in inverse polarity and is parallel connected across the two ends of the first impedance or the second impedance, wherein the two ends of the first impedance and the second impedance in series connection are for inputting:
1) DC pulsed power; or
2) the DC pulsed power with constant or variable voltage and constant or variable periods converted from DC power source; or
3) the DC pulsed power with constant or variable voltage and constant or variable periods converted from DC power which is further rectified from AC power; or
4) the half-wave or full-wave DC pulsed power rectified from AC power with constant or variable voltage and constant or variable frequency;
the bi-directional divided power in series resonance formed by the first and second impedances in series resonance is used to drive at least one bi-directional conducting light emitting diode set which is parallel connected across two ends of either the first impedance or the second impedance, or to drive at least two bi-directional conducting light emitting diode sets which are respectively parallel connected across the two ends of the first impedance and the second impedance to receive the divided power across the two ends of the first impedance and the two ends of the second impedance thereby including the said bi-directional light emitting diode drive circuit in pulsed power series resonance;
wherein it comprises:
the first impedance (Z101) including:
at least one capacitive impedance component, or two or more than two capacitive impedance components in series connection or parallel connection or series and parallel connection; or
capacitive impedance components and the additional inductive impedance components or resistive impedance components which can be optionally installed as needed, wherein it can include one or more than one kinds and one or more than one impedance components, or by two or more than two kinds of impedance components, wherein each kind of the impedance components is respectively to be one of more than one in series connection or parallel connection or series and parallel connection;

the second impedance (Z102) comprises at least one inductive impedance component, or two or more than two inductive impedance components in series connection or parallel connection or series and parallel connection; or inductive impedance components and the additional capacitive impedance components or resistive impedance components which can be optionally installed as needed, wherein it can include one or more than one kinds and one or more than one impedance components, or by two or more than two kinds of impedance components, wherein each kind of the impedance components is respectively to be one of more than one in series connection or parallel connection or series and parallel connection;

the first impedance (Z101) and the second impedance (Z102) are in series connection and are arranged to receive the pulsed power from power source at their two ends, wherein their inherent series resonance frequency in series connection is the same as the pulse period of the pulsed power from power source, thereby to appear series resonance status; at series resonance status, the first impedance (Z101) and the second impedance (Z102) cause the inputted pulsed power to form the bi-directional divided power in series resonance, which is then transmitted to the bi-directional conducting light emitting diode set (L100) that is parallel connected with the first impedance (Z101) or the second impedance (Z102) to drive the bi-directional conducting light emitting diode set (L100) to emit light;

the bi-directional conducting light emitting diode set (L100): it is constituted by at least one first light emitting diode (LED101) and at least one second light emitting diode (LED102) in parallel connection of inverse polarities, wherein the numbers of the first light emitting diode (LED101) and the numbers of the second light emitting diode (LED102) can be the same or different, further, the first light emitting diode (LED101) and the second light emitting diode (LED102) can be respectively constituted by one forward current polarity light emitting diode; or two or more than two forward current polarity light emitting diodes in series or parallel connections; or three or more than three forward current polarity light emitting diodes in series or parallel connections or in series and parallel connections;

the bi-directional conducting light emitting diode set (L100) can be optionally installed with one or more than one sets as needed to be parallel connected across the two ends of both or either of the first impedance (Z101) or the second impedance (Z102), wherein through the power input, the bi-directional divided power in series resonance is formed at the two ends of both the first impedance (Z101) and the second impedance (Z102), thereby to drive the bi-directional conducing light emitting diode set (L100) which is parallel connected across the two ends of the first impedance (Z101) or the second impedance (Z102) to emit light;

the bi-directional light emitting diode drive circuit in pulsed power series resonance, in the bi-directional light emitting diode drive circuit (U100) the first impedance (Z101) and the second impedance (Z102) as well as the bi-directional conducting light emitting diode set (L100) can be selected to be one or more than ones as needed;

the bi-directional divided power in series resonance formed by the first and second impedances in series resonance is used to drive at least one bi-directional light emitting diode set which is parallel connected across the two ends of the first impedance or the second impedance, or to drive at least two bi-directional conducting light emitting diode sets which are respectively parallel connected across the two ends of the first impedance and the second impedance to receive the divided power across the two ends of the first impedance and the two ends of the second impedance thereby including the said bi-directional light emitting diode drive circuit in pulsed power series resonance;

the first impedance (Z101), the second impedance (Z102), the bi-directional conducting light emitting diode set (L100), the first light emitting diode (LED101), the second light emitting diode (LED102) and various optional auxiliary circuit components can be optionally installed or not installed as needed based on application needs, wherein the installation quantity include constitution by one, wherein if more than one are selected in the application, the corresponding polarity relationship shall be determined based on circuit function requirement to execute series connection or parallel connection or series and parallel connections.

2. A bi-directional light emitting diode drive circuit in pulsed power series resonance as claimed in claim 1, wherein it is comprised of:

the first impedance (Z101) including at least one capacitive impedance component, especially by the capacitors (C100), wherein the number of the first impedance can be one or more than one;

the second impedance (Z102) including at least one inductive impedance components (I200), wherein the number of the second impedance can be one or more than one;

at least one first impedance (Z101) and at least one second impedance (Z102) are in series connection, wherein the two ends of them after series connection are for inputting:

1) DC pulsed power; or
2) the DC pulsed power with constant or variable voltage and constant or variable periods converted from DC power source; or
3) the DC pulsed power with constant or variable voltage and constant or variable periods converted from DC power which is further rectified from AC power; or
4) the half-wave or full-wave DC pulsed power rectified from AC power with constant or variable voltage and constant or variable frequency;

by taking advantage of aforementioned power, the bi-directional divided power in series resonance is formed at the series connected first and second impedance components, wherein the divided power is provided to drive at least one bi-directional conducting light emitting diode set (L100);

the series resonance frequency of the first impedance (Z101) and the second impedance (Z102) in series connection is the same as the pulse period of the pulsed power from power source, thereby to appear series resonance status;

the bi-directional conducting light emitting diode set (L100) including at least one first light emitting diode (LED101) and at least one second light emitting diode (LED102) in parallel connection of inverse polarities, wherein the numbers of the first light emitting diode (LED101) and the numbers of the second light emitting diode (LED102) can be the same or different, further, the first light emitting diode (LED101) and the second light emitting diode (LED102) can be respectively constituted by one forward current polarity light emitting diode; or two or more than two forward current polarity light emitting diodes in series or parallel connections; or three or more than three forward current polarity light emitting diodes in series or parallel connections or in series and parallel connections; the bi-directional conducting light emitting diode set (L100) can be optionally installed with one or more than one sets as needed to be parallel connected across the two ends of both or either of the first impedance (Z101) or the second impedance (Z102), wherein through the power input, the divided power is formed at the two ends of both the first impedance (Z101) and the second impedance (Z102), thereby to drive the bi-directional conducing light emitting diode set (L100) which is parallel connected across the two ends of the first impedance (Z101) or the second impedance (Z102) to emit light; or at least one bi-directional conducting light emitting diode set (L100) is parallel connected across the two ends of at least one second impedance (Z102), i.e. to be parallel connected across the two ends of the inductive impedance component (I200) which constitutes the second impedance (Z102), to be driven by the bi-directional divided power in series resonance across the two ends of the inductive impedance component, while its current is limited by the impedance of the first impedance (Z101), wherein when the capacitor (C100) (such as a bi-polar capacitor) is selected to be the first impedance component, then its current is limited by the capacitive impedance;

the first impedance (Z101), the second impedance (Z102) and the bi-directional conducting light emitting diode set (L100) are connected according to the aforesaid circuit structure including the bi-directional light emitting diode drive circuit (U100).

3. A bi-directional light emitting diode drive circuit in pulsed power series resonance as claimed in claim 1, wherein the current distribution effect formed by the parallel connection of the bi-directional conducting light emitting diode set (L100) and the second impedance (Z102) can be used to reduce the voltage variation across the two ends of the bi-directional conducting light emitting diode set (L100) corresponding to power source.

4. A bi-directional light emitting diode drive circuit in pulsed power series resonance as claimed in claim 1, wherein either one of the first light emitting diode (LED101) and the second light emitting diode (LED102) can be replaced by a diode (CR100) while the current direction of the diode (CR100) and the working current direction of the reserved first light emitting diode (LED101) or the second light emitting diode (LED102) are in parallel connection of inverse polarities.

5. A bi-directional light emitting diode drive circuit in pulsed power series resonance as claimed in claim 1, wherein if the first light emitting diode (LED101) and the second light emitting diode (LED102) which constitute the bi-directional conducting light emitting diode set (L100) are simultaneously installed with the current limit resistors (R103) and (R104) respectively, a current limit resistor (R100) can be directly series connected with the bi-directional conducting light emitting diode set (L100) to replace or to be installed with the current limit resistors (R103) and (R104), wherein the current limit resistor (R100) can also be replaced by an inductive impedance component (I100);

the bi-directional light emitting diode drive circuit (U100) is constituted by the said circuit structure and selection of auxiliary circuit components.

6. A bi-directional light emitting diode drive circuit in pulsed power series resonance as claimed in claim 1, wherein it is further parallel connected a zener diode across the two ends of the first light emitting diode (LED101) or the second light emitting diode (LED102) of the bi-directional conducting light emitting diode set (L100), or the zener diode can be first series connected with at least one diode to produce the function of zener voltage effect, then parallel connected across the two ends of the first light emitting diode (LED101) or the second light emitting diode (LED102); wherein it is comprised of that:

a zener diode (ZD101) is parallel connected across the two ends of the first light emitting diode (LED101) of the bi-directional conducting light emitting diode set (L100), wherein their polarity relationship is that the zener voltage of the zener diode (ZD101) is used to limit the working voltage across the two ends of the first light emitting diode (LED101);

the said zener diode (ZD101) can be optionally series connected with a diode (CR201) as needed, the advantages are 1) the zener diode (ZD101) can be protected from reverse current; 2) both diode (CR201) and zener diode (ZD101) have temperature compensation effect;

if the second light emitting diode (LED102) is selected for the bi-directional conducting light emitting diode set (L100), the two ends of the second light emitting diode (LED102) can be optionally parallel connected with a zener diode (ZD102) as needed, wherein their polarity relationship is that the working voltage of the second light emitting diode (LED102) is limited by the zener voltage of the zener diode (ZD102);

the said zener diode (ZD102) can be optionally series connected with a diode (CR202) as needed, the advantages are 1) the zener diode (ZD102) can be protected from reverse current; 2) both diode (CR202) and zener diode (ZD102) have temperature compensation effect.

7. A bi-directional light emitting diode drive circuit in pulsed power series resonance as claimed in claim 6, wherein the zener diode is constituted by:

1) a zener diode (ZD101) is parallel connected across the two ends of the first light emitting diode (LED101) of the bi-directional conducting light emitting diode set (L100), and a zener diode (ZD102) is parallel connected across the two ends of the second light emitting diode (LED102); or 2) the two zener diodes (ZD101) and (ZD102) are series connected in opposite directions, then further parallel connected across the two ends of the bi-directional conducting light emitting diode set (L100); or 3) the diode having bi-directional zener effect is parallel connected across the two ends of the bi-directional conducting light emitting diode set (L100) to replace the zener diodes (ZD101) and (ZD102);

all of the aforesaid three circuits can avoid over high end voltage of the first light emitting diode (LED101) and the second light emitting diode (LED102); or the bi-directional light emitting diode drive circuit in pulsed power series resonance, in which if the bi-directional conducting light emitting set (L100) in the bi-directional light emitting diode drive circuit (U100) is constituted by a first light emitting diode (LED101) and a second light emitting diode (LED102) in parallel connection at opposite directions, it is comprised of that:

the aforesaid zener diodes (ZD101) and (ZD102) can be optionally selected as needed to have the zener diode (ZD101) series connected with the diode (CR201) at forward polarity and have the zener diode (ZD102) series connected with the diode (CR202) at forward polarity, wherein the advantages are: 1) the zener diodes (ZD101), (ZD102) can be protected from reverse current; 2) both of the diode (CR201) and the first light emitting diode (ZD101) as well as both of the diode (CR202) and the zener diode (ZD102) have temperature compensation effect.

8. A bi-directional light emitting diode drive circuit in pulsed power series resonance as claimed in claim 1, wherein the first light emitting diode (LED101) is further installed with a charge/discharge device (ESD101), or the second light emitting diode (LED102) is installed with a charge/discharge device (ESD102), wherein the charge/discharge device (ESD101) and (ESD102) have the random charging or discharging characteristics which can stabilize the lighting stability of the first light emitting diode (LED101) and the second light emitting diode (LED102), whereby to reduce their lighting pulsations; the aforesaid charge/discharge devices (ESD101), (ESD102) can include the conventional charging and discharging batteries, or super-capacitors or capacitors.

9. A bi-directional light emitting diode drive circuit in pulsed power series resonance as claimed in claim 1, wherein the application circuits additionally installed with the charge/discharge device (ESD101) includes:
for the bi-directional light emitting diode drive circuit (U100), a charge/discharge device (ESD101) can be parallel connected across the two ends of the current limit resistor (R103) and the first light emitting diode (LED101) in series connection;
or a charge/discharge device (ESD102) can be further parallel connected across the two ends of the current limit resistor (R104) and the second light emitting diode (LED102) in series connection; wherein it is comprised of:
a charge/discharge device (ESD101) based on its polarity is parallel connected across the two ends of the first light emitting diode (LED101) and the current limit resistor (R103) in series connection, or is directly parallel connected across the two ends of the first light emitting diode (LED101), wherein the charge/discharge device (ESD101) has the random charge/discharge characteristics to stabilize the lighting operation and to reduce the lighting pulsation of the first light emitting diode (LED101);
if the second light emitting diode (LED102) is selected, a charge/discharge device (ESD102) based on its polarity is parallel connected across the two ends of the second light emitting diode (LED102) and the current limit resistor (R104) in series connection, wherein the charge/discharge device (ESD102) has the random charge/discharge characteristics to stabilize the lighting operation and to reduce the lighting pulsation of the second light emitting diode (LED102);
the aforesaid charge/discharge devices (ESD101), (ESD102) can include the conventional charging and discharging batteries, or super-capacitors or capacitors.

10. A bi-directional light emitting diode drive circuit in pulsed power series resonance as claimed in claim 1, wherein the application circuits additionally installed with the charge/discharge device (ESD101) includes:
if a first light emitting diode (LED101) is selected and is reversely parallel connected with a diode (CR100) in the bi-directional light emitting diode drive circuit (U100), its main circuit structure is that a charge/discharge device (ESD101) based on its polarity is parallel connected across the two ends of the first light emitting diode (LED101) and the current limit resistor (R103) in series connection, wherein the charge/discharge device (ESD101) has the random charge/discharge characteristics to stabilize the lighting operation and to reduce the lighting pulsation of the first light emitting diode (LED101);
the aforesaid charge/discharge devices (ESD101), (ESD102) can include the conventional charging and discharging batteries, or super-capacitors or capacitors.

11. A bi-directional light emitting diode drive circuit in pulsed power series resonance as claimed in claim 1, wherein the application circuits additionally installed with the charge/discharge device (ESD101) includes:
in the bi-directional light emitting diode drive circuit (U100), when the current limit resistor (R100) is selected to replace the current limit resistors (R103), (R104) for the common current limit resistor of the bi-directional conducting light emitting diode set (L100), or the current limit resistors (R103), (R104) and (R100) are not installed, the main circuit structure is constituted by that a charge/discharge device (ESD101) is directly parallel connected across the two ends of the first light emitting diode (LED101) at the same polarity, and a charge/discharge device (ESD102) is directly parallel connected across the two ends of the first light emitting diode (LED102) at the same polarity, wherein the charge/discharge devices (ESD101) and (ESD102) has the random charge or discharge characteristics;
aforesaid charge/discharge devices (ESD101), (ESD102) can include conventional charging and discharging batteries, or super-capacitors or capacitors.

12. A bi-directional light emitting diode drive circuit in pulsed power series resonance as claimed in claim 1, wherein the charge/discharge devices (ESD101) or (ESD102) in the bi-directional light emitting diode drive circuit (U100) have the characteristics of uni-polarity, thereby after parallel connection of the first light emitting diode (LED101) and the uni-polar charge/discharge device (ESD101), a diode (CR101) in series connection at forward polarity can be optionally installed to prevent the uni-polar charge/discharge device from damage by reverse voltage; and after parallel connection of the second light emitting diode (LED102) and the uni-polar charge/discharge device (ESD102), a diode (CR102) in series connection at forward polarity can be optionally installed to prevent the uni-polar charge/discharge device from damage by reverse voltage; the above said charge/discharge devices (ESD101), (ESD102) are constituted by conventional charge/discharge batteries, or super-capacitors or capacitors.

13. A bi-directional light emitting diode drive circuit in pulsed power series resonance as claimed in claim 1, wherein a diode (CR101) is parallel connected with at least one first light emitting diode (LED101) in inverse polarities, and a diode (CR102) is parallel connected with at least one second light emitting diode (LED102) in inverse polarities, wherein the two are further series connected in opposite directions including a bi-directional conducting light emitting diode set.

14. A bi-directional light emitting diode drive circuit in pulsed power series resonance as claimed in claim 1, wherein in the bi-directional light emitting diode drive circuit (U100), it can be optionally installed with one set or more than one sets of bi-directional conducting light emitting diode sets (L100) in series connection, parallel connection or series and parallel connection, wherein if one set or more than one sets are selected to be installed, they can be jointly driven by the divided power of a common second impedance (Z102) or driven individually by the divided power at the corresponding one of the multiple second impedances (Z102) which are in series connection or parallel connection.

15. A bi-directional light emitting diode drive circuit in pulsed power series resonance as claimed in claim 1, wherein if the charge/discharge device is not installed, then current conduction to light emitting diode is intermittent, whereby referring to the inputted voltage wave shape and duty cycle of current conduction, the light emitting forward current and the peak of light emitting forward voltage of each light emitting diode in the bi-directional conducting light emitting diode set (L100) can be correspondingly selected for the light emitting diode; if current conduction to light emitting diode is intermittent, the peak of light emitting forward voltage can be correspondingly selected based on the duty cycle of current conduction as long as the principle of that the peak of light emitting forward voltage does not damage the light emitting diode is followed.

16. A bi-directional light emitting diode drive circuit in pulsed power series resonance as claimed in claim 1, wherein if the charge/discharge device is not installed, then based on the value and wave shape of the light emitting forward voltage, the corresponding current value and wave shape from the forward voltage vs. forward current ratio are produced; however the peak of light emitting forward current shall follow the principle not to damage the light emitting diode.

17. A bi-directional light emitting diode drive circuit in pulsed power series resonance as claimed in claim 1, wherein it is series connected to the bi-directional power modulator of series connection type, wherein the bi-directional power modulator is constituted by the following:
   a bi-directional power modulator of series connection type (300), including the conventional electromechanical components or solid state power components and related electronic circuit components to modulate the bi-directional power output;
   a DC power modulator of series connection type (360), including conventional electromechanical components or solid state power components and related electronic circuit components to modulate the bi-directional power output;
   the circuit function operations are the following:
   i. the DC power modulator of series connection type (360) is series connected with the bi-directional light emitting diode drive circuit (U100), whereby to receive the pulsed power from the power source, wherein the pulsed power is modulated by the power modulator of series connection type (360) to execute power modulations such as pulse width modulation or current conduction phase angle control, or impedance modulation to drive the bi-directional light emitting diode drive circuit (U100); or
   ii. the bi-directional power modulator of series connection type (300) is series connected between the second impedance (Z102) and the bi-directional conducting light emitting diode set (L100), whereby the bi-directional divided power in series resonance across the two ends of the second impedance (Z102) is modulated by the bi-directional power modulator of series connection type (300) to execute power modulations such as pulse width modulation or current conduction phase angle control, or impedance modulation to drive the bi-directional conducting light emitting diode set (L100).

18. A bi-directional light emitting diode drive circuit in pulsed power series resonance as claimed in claim 1, wherein it is parallel connected to the bi-directional power modulator of parallel connection type, wherein the bi-directional power modulator of the parallel connection type is constituted by the following:
   the bi-directional power modulator of parallel connection type (400) including conventional electromechanical components or solid state power components and related electronic circuit components to modulate the bi-directional power output;
   a DC power modulator of parallel connection type (460) is constituted by conventional electromechanical components or solid state power components and related electronic circuit components to modulate the bi-directional power output;
   the circuit operating functions are the following:
   1) the DC power modulator of parallel connection type (460) is installed, wherein its output ends are for parallel connection with the bi-directional light emitting diode drive circuit (U100), while its input ends are provided for receiving the pulsed power from the power source, whereby the pulsed power is modulated by the DC power modulator of parallel connection type (460) to execute power modulations such as pulse width modulation or current conduction phase angle control, or impedance modulation to drive the bi-directional light emitting diode drive circuit (U100); or
   2) the bi-directional power modulator of parallel connection type (400) is installed, wherein its output ends are parallel connected with the input end of the bi-directional conducting light emitting diode set (L100), while the input ends of the bi-directional power modulator of parallel connection type (400) are parallel connected with two ends of the second impedance (Z102), whereby the bi-directional divided power in series resonance across the two ends of the second impedance (Z102) is modulated by the bi-directional power modulator of parallel connection type (400) to execute power modulations such as pulse width modulation or current conduction phase angle control, or impedance modulation to drive the bi-directional conducting light emitting diode set (L100).

19. A bi-directional light emitting diode drive circuit in pulsed power series resonance as claimed in claim 1, wherein it is driven by the output power from a DC to DC converter, wherein the DC to DC converter is constituted by:
   a DC to DC converter (5000) including conventional electromechanical components or solid state power components and related electronic circuit components, wherein its input ends receive DC power input while its output ends optionally provide for outputting the DC pulsed power with a constant or variable voltage and a constant or variable periods;
   the circuit operating functions are the following:
   the DC to DC converter (5000), in which its input ends receive DC power while its output ends provide DC pulsed power, wherein the bi-directional light emitting diode drive circuit (U100) is parallel connected with the output ends of the DC to DC converter (5000), and the input ends of the DC to DC converter receive the optionally selected DC power with constant or variable voltage, or the DC power rectified from AC power;
   the output ends of the DC to DC converter (5000) provide output which can be optionally selected to be a DC pulsed power with constant or variable voltage and constant or variable periods to control and drive the bi-directional light emitting diode drive circuit (U100);

in addition, the bi-directional light emitting diode drive circuit (U100) can also be controlled and driven by regulating the output power of the DC to DC converter (5000), or by executing pulse width modulation or current conduction phase angle control, or impedance modulation, etc to the power outputted.

20. A bi-directional light emitting diode drive circuit in pulsed power series resonance as claimed in claim 1, wherein the bi-directional light emitting diode drive circuit (U100) is series connected with a conventional impedance component (500) and is further parallel connected with the power source, wherein the impedance component (500) includes:

1) a component with resistive impedance characteristics; or
2) a component with inductive impedance characteristics; or
3) a component with capacitive impedance characteristics; or
4) a single impedance component with the combined impedance characteristics of at least two of the resistive impedance, or inductive impedance, or capacitive impedance simultaneously, thereby to provide DC or AC impedances; or
5) a single impedance component with the combined impedance characteristics of the capacitive impedance and inductive impedance, wherein its combined parallel resonance frequency is the same as the frequency of bi-directional power or pulse period of uni-directional pulsed power, thereby to produce a parallel resonance status; or
6) capacitive impedance components, or inductive impedance components, or resistive impedance components, including one or more than one kind of one and more than one impedance component, or two or more than two kinds of impedance components in series connection, or parallel connection, or series and parallel connections, thereby to provide a DC or AC impedance; or
7) the mutual series connection of a capacitive impedance component and an inductive impedance component, wherein its inherent series resonance frequency is the same as the frequency of bi-directional power or pulse period of uni-directional pulsed power, thereby to produce a parallel resonance status and the end voltage across two ends of the capacitive impedance component or the inductive impedance component appear in series resonance correspondingly;

or the capacitive impedance and the inductive impedance are in mutual parallel connection, whereby its inherent parallel resonance frequency is the same as the frequency of bi-directional power or the pulse period of uni-directional pulsed power, thereby to produce a parallel resonance status and appear the corresponding end voltage.

21. A bi-directional light emitting diode drive circuit in pulsed power series resonance as claimed in claim 1, wherein the optionally installed inductive impedance component (I200) of second impedance (Z102) can be further replaced by the power supply side winding of a transformer with inductive effect, wherein the self-coupled transformer (ST200) has a self-coupled voltage change winding (W0) with voltage raising function, in which the b, c ends of the self-coupled voltage change winding (W0) of the self-coupled transformer (ST200) are the power supply side which replace the inductive impedance component (I200) of the second impedance (Z102) including the second impedance (Z102), wherein its inherent series resonance frequency with the capacitor (C100) of the first impedance (Z101) in series connection produces a series resonance status with the pulse period of the pulsed power from the power source, wherein the a, c output ends of the self-coupled voltage change winding (W0) of the self-coupled transformer ST 200 provide AC power of voltage rise to drive the bi-directional conducting light emitting diode set (L100).

22. A bi-directional light emitting diode drive circuit in pulsed power series resonance as claimed in claim 1, wherein the optionally installed inductive impedance component (I200) of second impedance (Z102) can be further replaced by the power supply side winding of a transformer with inductive effect, wherein the self-coupled transformer (ST200) has a self-coupled voltage change winding (W0) with voltage drop function, in which the a, c ends of the self-coupled voltage change winding (W0) of the self-coupled transformer (ST200) are the power supply side which replace the inductive impedance component (I200) of the second impedance (Z102) including the second impedance (Z102), wherein its inherent series resonance frequency with the capacitor (C100) of the first impedance (Z101) in series connection produces a series resonance status with the pulse period of the pulse power from power source, wherein the b, c output taps of the self-coupled voltage change winding (W0) of the self-coupled transformer (ST200) provide AC power of voltage drop to drive the bi-directional conducting light emitting diode set (L100).

23. A bi-directional light emitting diode drive circuit in pulsed power series resonance as claimed in claim 1, wherein the optionally installed inductive impedance component (I200) of second impedance (Z102) can be further replaced by the power supply side winding of a transformer with inductive effect, wherein the separating type transformer (IT200) is comprised of a primary side winding (W1) and a secondary side winding (W2), in which the primary side winding (W1) and the secondary side winding (W2) are separated, wherein the primary side winding (W1) constitutes the second impedance (Z102), wherein its inherent series resonance frequency in series connection with the capacitor (C100) of the first impedance (Z101) produces a series resonance status with the pulse period of the pulsed power from power source, wherein the output voltage of the secondary side winding (W2) of the separating type transformer (IT200) can be optionally selected to provide AC power of voltage rise or voltage drop to drive the bi-directional conducting light emitting diode set (L100);

the inductive impedance component (I200) of the second impedance (Z102) is replaced by the power supply side winding of the transformer, while the output AC power of either voltage rise or voltage drop from the secondary side winding of the separating type transformer (IT200) is for driving the bi-directional conducting light emitting diode set (L100).

* * * * *